US012699283B2

(12) United States Patent
Hones et al.

(10) Patent No.: US 12,699,283 B2
(45) Date of Patent: Aug. 4, 2026

(54) OPHTHALMIC LENSES FOR REDUCING MYOPIA PROGRESSION AND LASER-BASED METHODS FOR FORMING THE SAME

(71) Applicant: SIGHTGLASS VISION, INC., Palo Alto, CA (US)

(72) Inventors: Peter Hones, Menlo Park, CA (US); Thomas W. Chalberg, Jr., Menlo Park, CA (US)

(73) Assignee: SightGlass Vision, Inc., Dallas, TX (US)

( * ) Notice: Subject to any disclaimer, the term of this patent is extended or adjusted under 35 U.S.C. 154(b) by 310 days.

(21) Appl. No.: 18/564,523

(22) PCT Filed: May 27, 2022

(86) PCT No.: PCT/US2022/031460
§ 371 (c)(1),
(2) Date: Nov. 27, 2023

(87) PCT Pub. No.: WO2022/251713
PCT Pub. Date: Dec. 1, 2022

(65) Prior Publication Data
US 2024/0264466 A1     Aug. 8, 2024

Related U.S. Application Data

(60) Provisional application No. 63/194,905, filed on May 28, 2021.

(51) Int. Cl.
G02C 7/02          (2006.01)
(52) U.S. Cl.
CPC ......... G02C 7/022 (2013.01); G02C 2202/16 (2013.01)

(58) Field of Classification Search
CPC .... G02C 7/022; G02C 7/021; G02C 2202/16; G02C 2202/24; B29D 11/00461;
(Continued)

(56) References Cited

U.S. PATENT DOCUMENTS

| | | | |
|---|---|---|---|
| 149,270 A | 3/1874 | Watson | |
| 338,003 A | 3/1886 | Ward | |

(Continued)

FOREIGN PATENT DOCUMENTS

| | | |
|---|---|---|
| CA | 2278249 | 6/1999 |
| CN | 1909860 | 2/2007 |

(Continued)

OTHER PUBLICATIONS

Ahern "Biochemical, reagents kits offer scientists good return on investment," The Scientist, Jul. 1995, 9(15):20.
(Continued)

*Primary Examiner* — William R Alexander
(74) *Attorney, Agent, or Firm* — Fish & Richardson P.C.

(57)          ABSTRACT

A method for forming optical elements at a surface of an ophthalmic lens including a lens material includes providing a laser interaction layer at a surface of the ophthalmic lens, the laser interaction layer including a first material having a first absorption of radiation at a first wavelength, $\lambda_1$, the lens material having a second absorption of radiation at $\lambda_1$, the second absorption being lower than the first absorption, exposing discrete areas of the laser interaction layer to laser radiation at $\lambda_1$ sufficient to form an optical element at each discrete area in the lens material.

11 Claims, 6 Drawing Sheets

10

(58) Field of Classification Search
CPC ........ B29D 11/00009; B29D 11/00317; B29D
11/00355; B29D 11/00865; B29L
2011/0016; B29C 59/16; B29C 2791/009
USPC ...................................................... 351/159.6
See application file for complete search history.

(56) References Cited

U.S. PATENT DOCUMENTS

| | | | |
|---|---|---|---|
| 506,983 | A | 10/1893 | Diemmer et al. |
| 712,466 | A | 10/1902 | Taylor |
| 1,959,915 | A | 5/1934 | Guthrie |
| 3,507,566 | A | 4/1970 | Knapp |
| 4,194,814 | A | 3/1980 | Fischer et al. |
| 4,338,003 | A | 7/1982 | Adrian |
| 4,704,016 | A | 11/1987 | de Carle |
| 4,710,327 | A | 12/1987 | Neefe |
| 4,889,421 | A | 12/1989 | Cohen |
| 4,909,818 | A | 3/1990 | Jones |
| 5,034,100 | A | 7/1991 | Sides |
| 5,044,742 | A | 9/1991 | Cohen |
| 5,116,112 | A | 5/1992 | Rawlings |
| 5,260,727 | A | 11/1993 | Oksman et al. |
| 5,585,968 | A | 12/1996 | Guhman et al. |
| 5,800,992 | A | 9/1998 | Fodor et al. |
| 5,837,461 | A | 11/1998 | Neitz |
| 5,867,247 | A | 2/1999 | Martin et al. |
| 5,905,561 | A | 5/1999 | Lee et al. |
| 5,926,250 | A | 7/1999 | Mukaiyama et al. |
| 6,149,270 | A | 11/2000 | Hayashi |
| 6,343,861 | B1 | 2/2002 | Kris et al. |
| 6,582,908 | B2 | 6/2003 | Fodor et al. |
| 6,706,867 | B1 | 3/2004 | Lorenz |
| 6,712,466 | B2 | 3/2004 | Dreher |
| 6,712,467 | B1 | 3/2004 | Kitani |
| 6,754,299 | B2 | 6/2004 | Patch |
| 6,836,619 | B2 | 12/2004 | Ohmura |
| 6,997,554 | B2 | 2/2006 | Nakada et al. |
| 7,025,460 | B2 | 4/2006 | Smith et al. |
| 7,506,983 | B2 | 3/2009 | To et al. |
| 7,604,351 | B2 | 10/2009 | Fukuma et al. |
| 7,665,842 | B2 | 2/2010 | Ho et al. |
| 7,766,482 | B2 | 8/2010 | Smith et al. |
| 7,862,171 | B2 | 1/2011 | Varnas et al. |
| 7,901,075 | B2 | 3/2011 | Rooney et al. |
| 7,992,997 | B2 | 8/2011 | Varnas |
| 7,997,727 | B2 | 8/2011 | Ho et al. |
| 8,052,278 | B2 | 11/2011 | Bovet et al. |
| 8,057,034 | B2 | 11/2011 | Ho et al. |
| 8,079,702 | B2 | 12/2011 | Ballet et al. |
| 8,115,792 | B2 | 2/2012 | Petsch et al. |
| 8,162,477 | B2 | 4/2012 | Carimalo et al. |
| 8,240,847 | B2 | 8/2012 | Holden et al. |
| RE43,851 | E | 12/2012 | To et al. |
| 8,342,684 | B2 | 1/2013 | Ho et al. |
| 8,500,278 | B2 | 8/2013 | Lo et al. |
| 8,540,365 | B2 | 9/2013 | Varnas |
| 8,684,520 | B2 | 4/2014 | Lindacher et al. |
| 8,690,319 | B2 | 4/2014 | Menezes |
| 8,807,747 | B2 | 8/2014 | Guilloux et al. |
| RE45,147 | E | 9/2014 | To et al. |
| 8,833,936 | B2 | 9/2014 | Varnas |
| 8,926,092 | B2 | 1/2015 | Weeber |
| 8,931,897 | B2 | 1/2015 | Holden et al. |
| 8,950,860 | B2 | 2/2015 | Tse et al. |
| 8,951,729 | B2 | 2/2015 | Neitz et al. |
| 8,992,010 | B2 | 3/2015 | Ho et al. |
| 8,998,408 | B2 | 4/2015 | Wei et al. |
| 9,360,683 | B2 | 6/2016 | Buehren |
| 9,417,463 | B2 | 8/2016 | Brennan et al. |
| 9,423,633 | B2 | 8/2016 | Ho et al. |
| 9,547,182 | B2 | 1/2017 | Collins et al. |
| 9,594,259 | B2 | 3/2017 | Brennan et al. |
| 9,625,739 | B2 | 4/2017 | Brennan et al. |
| 9,664,927 | B2 | 5/2017 | Wright et al. |
| 9,709,819 | B2 | 7/2017 | Lippens et al. |
| 9,720,253 | B2 | 8/2017 | Neitz et al. |
| 9,733,494 | B2 | 8/2017 | Brennan et al. |
| 9,746,693 | B2 | 8/2017 | Peloux et al. |
| 9,829,722 | B2 | 11/2017 | Tse et al. |
| 10,012,849 | B2 | 7/2018 | Collins et al. |
| RE47,006 | E | 8/2018 | To et al. |
| 10,042,091 | B2 | 8/2018 | Kildishev et al. |
| 10,061,143 | B2 | 8/2018 | Brennan et al. |
| 10,156,737 | B2 | 12/2018 | Martinez et al. |
| 10,203,522 | B2 | 2/2019 | Bakaraju et al. |
| 10,231,897 | B2 | 3/2019 | Tse et al. |
| 10,247,964 | B2 | 4/2019 | Sankaridurg et al. |
| 10,302,962 | B2 | 5/2019 | Neitz et al. |
| 10,429,670 | B2 | 10/2019 | Newman |
| 10,571,717 | B2 | 2/2020 | Neitz et al. |
| 10,787,707 | B2 | 9/2020 | Neitz et al. |
| 10,795,181 | B2 | 10/2020 | Neitz et al. |
| 10,884,264 | B2 | 1/2021 | Hones et al. |
| 11,048,102 | B2 | 6/2021 | Neitz |
| 11,493,781 | B2 | 11/2022 | Neitz et al. |
| 11,543,681 | B2 | 1/2023 | Neitz et al. |
| 11,815,745 | B2 | 11/2023 | Neitz et al. |
| 11,899,288 | B2 | 2/2024 | Neitz et al. |
| 2002/0140900 | A1 | 10/2002 | Streibig |
| 2003/0082576 | A1 | 5/2003 | Jones et al. |
| 2003/0209040 | A1 | 11/2003 | Hashimoto et al. |
| 2004/0110179 | A1 | 6/2004 | Shuber |
| 2004/0150787 | A1 | 8/2004 | Niculas |
| 2005/0208555 | A1 | 9/2005 | Raimond |
| 2006/0055627 | A1 | 3/2006 | Wilson |
| 2006/0082729 | A1 | 4/2006 | To et al. |
| 2006/0118263 | A1 | 6/2006 | Silvestrini |
| 2006/0235428 | A1 | 10/2006 | Silvestrini |
| 2006/0285071 | A1 | 12/2006 | Erickson et al. |
| 2007/0026167 | A1 | 2/2007 | Bourdelais et al. |
| 2007/0115431 | A1 | 5/2007 | Smith et al. |
| 2007/0247588 | A1 | 10/2007 | Cano |
| 2007/0296916 | A1 | 12/2007 | Holden et al. |
| 2008/0030675 | A1 | 2/2008 | Dillon |
| 2008/0077239 | A1 | 3/2008 | Zickler et al. |
| 2008/0084534 | A1 | 4/2008 | Lindacher et al. |
| 2008/0151183 | A1 | 6/2008 | Altmann |
| 2008/0218687 | A1 | 9/2008 | Philips |
| 2008/0221674 | A1 | 9/2008 | Blum et al. |
| 2008/0309882 | A1 | 12/2008 | Thom et al. |
| 2009/0059168 | A1 | 3/2009 | Miller et al. |
| 2009/0115962 | A1 | 5/2009 | Bovet et al. |
| 2009/0257026 | A1 | 10/2009 | Varnas et al. |
| 2010/0021889 | A1 | 1/2010 | Juo |
| 2010/0091240 | A1 | 4/2010 | Drobe et al. |
| 2010/0141729 | A1* | 6/2010 | Petsch ................... B41M 5/267 347/225 |
| 2010/0149488 | A1 | 6/2010 | Lo et al. |
| 2011/0051079 | A1 | 3/2011 | Martinez et al. |
| 2011/0194195 | A1 | 8/2011 | Zalevsky et al. |
| 2011/0313058 | A1 | 12/2011 | Neitz et al. |
| 2012/0014977 | A1 | 1/2012 | Furihata |
| 2012/0062836 | A1 | 3/2012 | Tse et al. |
| 2012/0182520 | A1 | 7/2012 | Neitz et al. |
| 2013/0053425 | A1 | 2/2013 | To et al. |
| 2013/0103147 | A1 | 4/2013 | Christie et al. |
| 2013/0107206 | A1 | 5/2013 | Slater |
| 2014/0080900 | A1 | 3/2014 | Neitz et al. |
| 2014/0111763 | A1 | 4/2014 | Griffin |
| 2015/0036102 | A1 | 2/2015 | Ghosh et al. |
| 2015/0109574 | A1 | 4/2015 | Tse et al. |
| 2015/0111782 | A1 | 4/2015 | Neitz et al. |
| 2015/0160477 | A1 | 6/2015 | Dai et al. |
| 2015/0316788 | A1 | 11/2015 | Holden et al. |
| 2015/0331255 | A1 | 11/2015 | Sankaridurg et al. |
| 2016/0026000 | A1 | 1/2016 | Kester |
| 2016/0143801 | A1 | 5/2016 | Lam et al. |
| 2016/0377884 | A1 | 12/2016 | Lau et al. |
| 2017/0018916 | A1 | 1/2017 | Itsuki et al. |
| 2017/0115509 | A1 | 4/2017 | Brennan et al. |
| 2017/0131567 | A1 | 5/2017 | To et al. |
| 2017/0168320 | A1 | 6/2017 | Tsubota et al. |
| 2017/0184875 | A1 | 6/2017 | Newman |
| 2017/0189168 | A1 | 7/2017 | Zickler et al. |

(56) References Cited

U.S. PATENT DOCUMENTS

| | | | |
|---|---|---|---|
| 2017/0192252 A1 | 7/2017 | Brennan et al. | |
| 2017/0276963 A1 | 9/2017 | Brennan et al. | |
| 2017/0292160 A1 | 10/2017 | Neitz et al. | |
| 2017/0336653 A1 | 11/2017 | Bakaraju | |
| 2018/0112268 A1 | 4/2018 | Neitz et al. | |
| 2018/0275425 A1 | 9/2018 | Collins et al. | |
| 2018/0275427 A1* | 9/2018 | Lau | G02C 7/081 |
| 2018/0284326 A1 | 10/2018 | Arima et al. | |
| 2019/0033619 A1 | 1/2019 | Neitz et al. | |
| 2019/0056322 A1* | 2/2019 | Schulz | B41M 5/26 |
| 2019/0235279 A1* | 8/2019 | Hones | G02C 7/022 |
| 2019/0293840 A1 | 9/2019 | Takeshita | |
| 2019/0302477 A1 | 10/2019 | Neitz et al. | |
| 2020/0073147 A1 | 3/2020 | Bakaraju et al. | |
| 2020/0089023 A1 | 3/2020 | Zhou et al. | |
| 2020/0271955 A1 | 8/2020 | Neitz et al. | |
| 2020/0393699 A1 | 12/2020 | Neitz | |
| 2021/0165244 A1 | 6/2021 | Hones et al. | |
| 2021/0341753 A1 | 11/2021 | Neitz | |
| 2022/0011602 A1 | 1/2022 | Chalberg, Jr. et al. | |
| 2022/0035179 A1 | 2/2022 | Rappon et al. | |
| 2022/0146857 A1 | 5/2022 | Hones, Jr. et al. | |
| 2022/0252904 A1 | 8/2022 | Hones, Jr. et al. | |
| 2023/0107026 A1 | 4/2023 | Neitz et al. | |
| 2023/0134059 A1* | 5/2023 | Back | A61F 2/1637 623/6.11 |
| 2023/0137646 A1 | 5/2023 | Neitz et al. | |
| 2023/0181030 A1 | 6/2023 | Chalberg, Jr. et al. | |
| 2023/0382064 A1 | 11/2023 | Chalberg, Jr. | |
| 2023/0384618 A1 | 11/2023 | Neitz et al. | |
| 2024/0192522 A1 | 6/2024 | Hones et al. | |
| 2024/0295752 A1 | 9/2024 | Neitz et al. | |

FOREIGN PATENT DOCUMENTS

| | | |
|---|---|---|
| CN | 2924572 | 7/2007 |
| CN | 101273882 | 10/2008 |
| CN | 101595420 | 12/2009 |
| CN | 101730500 | 6/2010 |
| CN | 101268408 | 3/2011 |
| CN | 102238927 | 11/2011 |
| CN | 102892380 | 1/2013 |
| CN | 103097940 | 5/2013 |
| CN | 103576338 | 2/2014 |
| CN | 103959138 | 7/2014 |
| CN | 104094164 | 10/2014 |
| CN | 104094165 | 10/2014 |
| CN | 103293707 | 12/2014 |
| CN | 104656271 | 5/2015 |
| CN | 104678572 | 6/2015 |
| CN | 105378545 | 3/2016 |
| CN | 221056776 | 5/2024 |
| CN | 221101192 | 6/2024 |
| CN | 221149073 | 6/2024 |
| CN | 221378417 | 7/2024 |
| EP | 0089775 | 10/1986 |
| EP | 0457612 | 11/1991 |
| EP | 1042700 | 3/2002 |
| EP | 2548533 | 1/2013 |
| EP | 3667401 | 6/2020 |
| HK | 1210838 | 5/2016 |
| JP | S5829627 | 2/1983 |
| JP | 2003-029216 | 1/2003 |
| JP | 2004-514921 | 5/2004 |
| JP | 2008-040497 | 2/2008 |
| JP | 2008-514318 | 5/2008 |
| JP | 4891249 | 3/2012 |
| JP | 2012-185348 | 9/2012 |
| JP | 2013-537317 | 9/2013 |
| JP | 2016-018158 | 2/2016 |
| JP | 2017-510851 | 4/2017 |
| JP | 2019-529968 | 10/2019 |
| KR | 100686551 | 2/2007 |
| KR | 100840845 | 6/2008 |

| | | |
|---|---|---|
| TW | 279510 | 6/1996 |
| TW | I446830 | 7/2001 |
| TW | 201211618 | 3/2012 |
| TW | I370278 | 8/2012 |
| TW | 201307942 | 2/2013 |
| TW | I493240 | 7/2015 |
| TW | I530727 | 4/2016 |
| TW | I559044 | 11/2016 |
| TW | I561885 | 12/2016 |
| WO | WO 1986/006846 | 11/1986 |
| WO | WO 1997/031286 | 8/1997 |
| WO | WO 1999/066366 | 12/1999 |
| WO | WO 2000/052516 | 9/2000 |
| WO | WO 2002/031585 | 4/2002 |
| WO | WO 2006/034652 | 4/2006 |
| WO | WO 2006/113149 | 10/2006 |
| WO | WO 2007/082268 | 7/2007 |
| WO | WO 2007/132834 | 11/2007 |
| WO | WO 2008/026674 | 3/2008 |
| WO | WO 2008/045847 | 4/2008 |
| WO | WO 2008/059178 | 5/2008 |
| WO | WO 2008/083418 | 7/2008 |
| WO | WO 2010/019397 | 2/2010 |
| WO | WO 2010/075319 | 7/2010 |
| WO | WO 2010/088644 | 8/2010 |
| WO | WO 2011/031948 | 3/2011 |
| WO | WO 2012/034265 | 3/2012 |
| WO | WO 2012/097213 | 7/2012 |
| WO | WO 2013/015743 | 1/2013 |
| WO | WO 2013/082545 | 6/2013 |
| WO | WO 2013/134825 | 9/2013 |
| WO | WO 2014/131879 | 9/2014 |
| WO | WO 2014/194444 | 12/2014 |
| WO | WO 2015/055322 | 4/2015 |
| WO | WO 2015/147758 | 10/2015 |
| WO | WO 2015/186723 | 12/2015 |
| WO | WO 2016/138512 | 9/2016 |
| WO | WO 2017/178430 | 10/2017 |
| WO | WO 2018/026697 | 2/2018 |
| WO | WO 2018/076057 | 5/2018 |
| WO | WO 2018/195600 | 11/2018 |
| WO | WO 2018/208724 | 11/2018 |
| WO | WO 2019/152438 | 8/2019 |
| WO | WO 2019/166653 | 9/2019 |
| WO | WO 2020/113212 | 6/2020 |
| WO | WO 2020/138127 | 7/2020 |
| WO | WO 2020/138134 | 7/2020 |
| WO | WO 2020/180817 | 9/2020 |
| WO | WO 2021/236687 | 11/2021 |
| WO | WO 2023/114400 | 6/2023 |
| WO | WO 2024/129102 | 6/2024 |
| WO | WO 2024/145395 | 7/2024 |
| WO | WO 2024/145397 | 7/2024 |

OTHER PUBLICATIONS

Anstice et al., "Effect of dual-focus soft contact lens wear on axial myopia progression in children," Ophthalmology, 2011, 1152-1161.
Applied Biosystems—Product Bulletin—Automated DNA Sequencing [online] "ABI Prism® BigDyeTM Primer Sequencing Kit," 2000, retrieved from URL <tools.thermofisher.com/content/sfs/brochures/cms_040730.pdf>, 4 pages.
Brennan et al., "Commonly held beliefs about myopia that lack a robust evidence base," Eye & Contact Lens, Jul. 2019, 45(4):215-225.
Carkeet et al., "Repeatability of IOLMaster Biometry in Children, Optometry and Vision Science", Nov. 2004, 81(11): 829-834.
Carroll et al., "Cone photoreceptor mosaic disruption associated with Cys203Arg mutation in the M-cone opsin," Proceedings of the National Academy of Sciences of the United States of America, 2009, 106(49):20948-20953.
Carroll et al., "Estimates of L:M cone ratio from ERG flicker photometry and genetics", Journal of Vision, 2002, 2(8):531-542.
Carroll et al., "Functional photoreceptor loss revealed with adaptive optics: An alternate cause of color blindness," Proceedings of the National Academy of Sciences of the United States of America, 2004, 101(22):8461-8466.

(56)            References Cited

OTHER PUBLICATIONS

Carroll, J., McMahon, C., Neitz, M., & Neitz, J. (2000). Flicker-photometric electroretinogram estimates of L: M cone photorecep-tor ratio in men with photopigment spectra derived from genetics. Journal of The Optical Society of America A, 17,499-509.

Chamberlain et al., "A 3-year Randomized Clinical Trial of MiSight Lenses for Myopia Control", Optom Vis Sci, 2019, 96(8): 556-567.

Cheng et al., "Effect of Bifocal and Prismatic Bifocal Spectacles on Myopia Progression in Children: Three-Year Results of a Random-ized Clinical Trial", JAMA Ophthalmology, Mar. 2014, 132(3):258-264.

Cheng et al., "Soft contact lenses with positive spherical aberration for myopia control," Optometry and Vision Science, Apr. 2016, 93(4):353-366.

Crognale et al., "Characterization of a novel form of X-linked incomplete achromatopsia", Visual Neuroscience, 2004, 21(3):197-203.

Davidoff, "Cone opsin gene variants in color blindness and other vision disorders," 2015, Retrieved from the Internet: <https://digital.lib.washington.edu/researchworks/bitstream/handle/1773/33578/Davidoff_washington_0250E_15133.pdf?sequence=1&isAllowed=y>, 132 pages.

Drummond-Borg, et al., "Molecular patterns of X chromosome-linked color vision genes among 134 men of European ancestry," Proceedings of the National Academy of Sciences of the United States of America, Feb. 1989, 86:983-987.

Extended European Search Report in European Appln. No. 22812315.4, dated Sep. 19, 2024, 7 pages.

Gardner et al, "Three Different Cone Opsin Gene Array Mutational Mechanisms with Genotype-Phenotype Correlation and Functional Investigation of Cone Opsin Variants" Human Mutation (2014) vol. 35(11), pp. 1354-1362.

GeneCards [online], "GeneCard for the OPNIMW gene", retrieved on Apr. 6, 2020, retrieved from URL<genecards.org/cgi-bin/carddisp_pl?gene=OPNIMW>, 27 pages.

Goodman's Introduction to Fourier Optics, McGraw-Hill 1996, 457 pages.

Greenwald et al., "Role of a Dual Splicing and Amino Acid Code in Myopia, Cone Dysfunction and Cone Dystrophy Associated with L/M Opsin Interchange Mutations," Translation Vision Science & Technology, vol. 6, No. 3, dated May 10, 2017, 19 pages.

Gunther et al., "Individual differences in chromatic (red/green) contrast sensitivity are constrained by the relative number of L-versus M-cones in the eye," Vision Research, May 2002, 42(11):1367-1378.

Gwiazda et al., "A Randomized Clinical Trial of Progressive Addition Lenses versus Single Vision Lenses on the Progression of Myopia in Children", Investigative Ophthalmology & Visual Sci-ence, Apr. 2003, 44:1492-1500.

Hahner et al., "Strategies for SNP genotyping by mass spectrom-etry," International Congress Series, Jan. 2003, 1239: 11-16.

Halushka et al., "Patterns of single-nucleotide polymorphisms in candidate genes for blood-pressure homeostasis", Nat Genet, 1999, 239-247.

Hattersley et al., "What makes a good genetic association study?" The Lancet, Oct. 2005, 366(9493):1315-1323.

Hirschhorn et al., "A comprehensive review of genetic association studies," Genetics in Medicine, 2002, 4(2):45-61.

Hofer et al., "Organization of the Human Trichromatic Cone Mosaic," Journal of Neuroscience, Oct. 19, 2005, 25(42):9669-9679.

International Search Report and Written Opinion in International Appln. No. PCT/US22/31460, mailed Oct. 25, 2022, 9 pages.

Jones et al., "The Prevalence and Impact of High Myopia," Eye & Contact Lens, May 2012, 38(3):188-96.

Kuchenbecker et al, "Topography of the long- to middle-wavelength sensitive cone ratio in the human retina assessed with a wide-field color multifocal electroretinogram," Vis Neurosci, May-Jun. 2008, 25(3):301-6.

Lam et al. "Defocus Incorporated Multiple Segments (DIMS) spectacle lenses slow myopia progression: a 2-year randomised clinical trial," Br J Ophthalmol, Mar. 2019, 104(3):363-368.

Lucentini, "Gene association studies typically wrong: reproducible gene-disease associations are few and far between", The Scientist, 2004, 18(24): p. 20.

Mcclements, Michelle et al. "Variations in Opsin Coding Sequences Cause X-Linked Cone Dysfunction Syndrome, with Myopia and Dichromacy" Investigative Ophthalmology & Visual Science (2013) vol. 54(2), pp. 1361-1369.

McMahon et al., "The L:M cone ratio in males of African descent with normal color vision," Journal of Vision, 2008, 8(2):1-9.

Michaelides et al., "X-Linked Cone Dysfunction Syndrome with Myopia and Protanopia" Ophthalmology, Aug. 2005, 112(8): 1448-1454.

Michaelides, et al. (2010) "The PROM1 mutation p.R373C causes an autosomal dominant bull's eye maculopathy associated with rod, rod-cone, and macular dystrophy, " IOVS, 51(9): 4771-4780.

Mizrahi-Meissonnier et al., "Variable Retinal Phenotypes Caused by Mutations in the X-Linked Photopigment Gene Array," Inves-tigative Ophthalmology & Visual Science, Aug. 2010, (51):3884-3892.

Montana.edu [online], "Optical System Design—S15," Upon infor-mation and belief, available no later than May 27, 2022, retrieved on Apr. 15, 2024, retrieved from URL <https://www.montana.edu/jshaw/documents/18%20EELE582_S15_OTFMTF.pdf>, 18 pages.

Mummidi et al., "Evolution of Human and Non-human Primate CC Chemokine Receptor 5 Gene and mRNA: Potential Roles for Haplotype and mRNA Diversity, Differential Haplotype-Specific Transcriptional Activity, and Altered Transcription Factor Binding to Polymorphic Nucleotides in the Pathogenesis of HIV-1 and Simian Immunodeficiency VIRUS*210", Journal of Biological Chem-istry, 2000, 275(25):18946-18961.

Nathans et al., "Molecular Genetics of Human Blue Cone Monochromacy", Aug. 1989, 45(4920): pp. 831-838.

Nathans et al., "Molecular Genetics of Inherited Variation in Human Color Vision", Apr. 1986, 232(4747): pp. 203-210.

NCBI Database GenBank Accession No. NM 020061, Nov. 1, 2009, National Center for Biotechnology Information, National Library of Medicine, Bethesda, MD, USA, 7 pages.

Neitz et al. "Variety of genotypes in males diagnosed as dichromatic on a conventional clinical anomaloscope", Visual Neuroscience, 2004, 21(3):205-216.

Neitz et al., "Cone mosaic disruption caused by L/M opsin muta-tions in bornholm eye disease," ARVO Annual Meeting Abstract, Apr. 2011, 2 pages.

Neitz et al., "Polymorphism in the No. of genes encoding long-wavelength-sensitive cone pigments among males with normal color vision", Vision Research, Sep. 1995, 35(17): 2395-2407.

Neitz, "A new mass screening test for color-vision deficiencies in children" Color Research & Application, 2001, 26(1): S239-S249.

Oda, et al. (2003) "Analysis of L-cone/M-cone visual pigment gene arrays in females by long-range PCR" Vision Research, vol. 43, pp. 489-495.

Okada et al., "Target Spatial Frequency Determines the Response to Conflicting Defocus—and Convergence—Driven Accommodative Stimuli," 2006, Elsevier, vol. 46, pp. 475-484.

Photo.net[online], "Modulation Transfer Function—what is it and why does it matter?," available on or before Apr. 28, 2007, via Internet Archive: Wayback Machine URL<https://web.archive.org/web/20070714225725/http://photo.net/learn/optics/mtf/index?&for_print=1>, 6 pages.

Radhakrishna, et al., "The 'X-linked' severe form of myopia locus at Xq28 (MYP1): Narrowing of the critical region and exclusion of twelve known genes localized in the interval.", ARVO Annual Meeting Abstract, May 2005, 1 page.

Ruiz-Pomeda et al., "MiSight Assessment Study Spain (MASS). A 2-year randomized clinical trial," Graefe's Archive for Clinical and Experimental Ophthalmology, Feb. 3, 2018, 256:1011-1021.

Sankaridurg et al., "Decrease in rate of myopia progression with a contact lens designed toreduce relative peripheral huperopia: One-year results," IOVS, Dec. 2011, 52(13):9362-9367.

(56)                    References Cited

OTHER PUBLICATIONS

Scholl et al., "Macular dystrophy with protan genotype and phenotype studied with cone type specific ERGs," Current Eye Research, 2001, 22(3):221-228.
Scholl et al., "Progressive cone dystrophy with deutan genotype and phenotype," Graefe's Arch Clin Exp Ophthalmol, 2006, 244:183-191.
Schwartz et al., "X-linked myopia: Bornholm Eye Disease", Clinical Genetics, 1990, 38(4):281-286.
Slrlounge.com [online], "Diffraction, Aperture, and Starburst Effects," 2022, retrieved on Jun. 6, 2024, retrieved from URL<https://www.slrlounge.com/diffraction-aperture-and-starburst-effects/>, 16 pages.
Tedja et al., "Genome-wide association meta-analysis highlights light-induced signaling as a driver for refractive error", Nature Genetics, Jun. 2018, 50(6):834-848.
Twelker et al., "Children's Ocular Components and Age, Gender, and Ethnicity," Optometry and Vision Science, Aug. 2009, 86(8):918-935.
Ueyama et al., "Unique haplotype in exon 3 of cone opsin mRNA affects splicing of its precursor, leading to congenital color vision defect," Biochemical and Biophysical Research Communications, 2012, 424(1):152-157.
Verrelli et al., "Signatures of Selection and Gene Conversion Associated with Human Color Vision Variation", The American Journal of Human Genetics, 2004,75(3): 363-375.
Vitale et al, "Increased prevalence of myopia in the United States between 1971-1972 and 1999-2004," Arch Ophthalmol., Dec. 2009, 127(12):1632-1639.
Winderickx et al., "Defective colour vision associated with a missense mutation in the human green visual pigment gene", Nat Genet 1992, 251-256.
Winderickx, et al. (1993) "Haplotype diversity in the human red and green opsin genes: evidence for frequent sequence exchange in exon 3," Human Molecular Genetics, 2(9):1413-1421.
Young et al., "X-Linked High Myopia Associated with Cone Dysfunction", Arch Ophthalmol. 2004, 122(6):897-908.
Young, et al., (2001) "Further refinement of the MYP2 locus for autosomal dominant high myopia by linkage disequilibrium analysis", Ophthalmic Genetics, vol. 22, pp. 69-75.
Zhang, "Genetics of Refraction and Myopia", Progress in Molecular Biology and Translational Science, 2015, 134: 269-279.

* cited by examiner

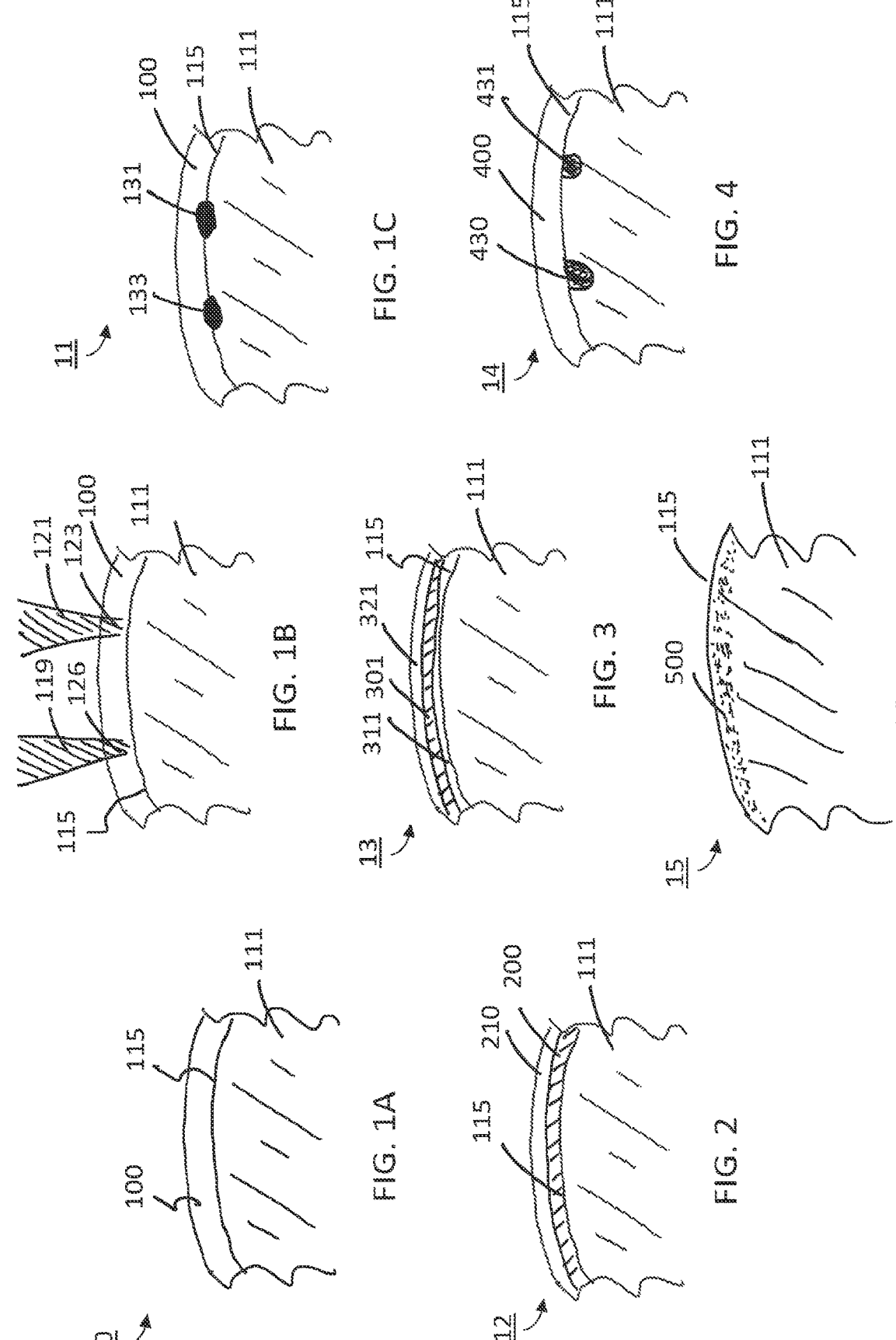

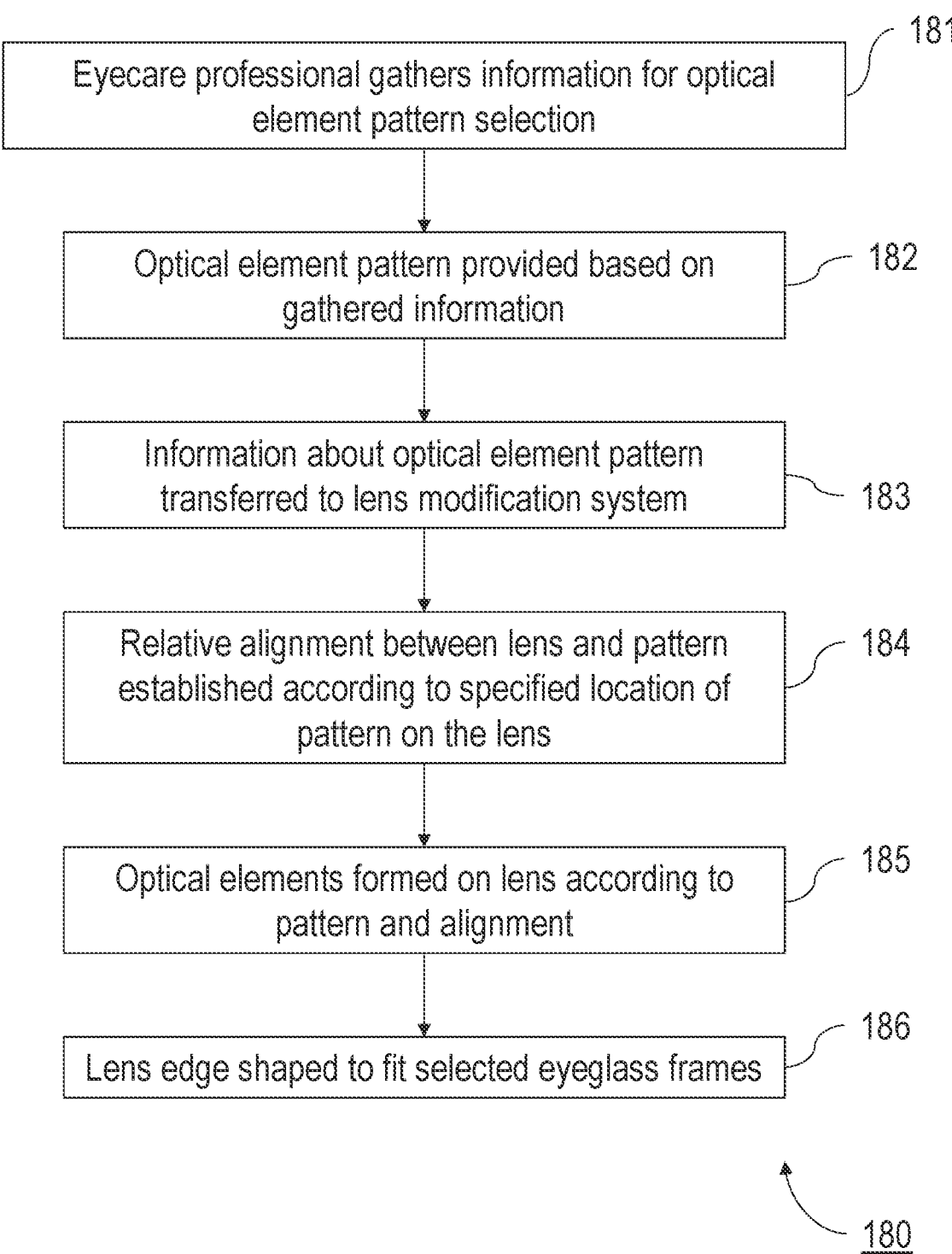

181 Eyecare professional gathers information for optical element pattern selection 182 Optical element pattern provided based on gathered information 183 Information about optical element pattern transferred to lens modification system 184 Relative alignment between lens and pattern established according to specified location of pattern on the lens 185 Optical elements formed on lens according to pattern and alignment 186 Lens edge shaped to fit selected eyeglass frames

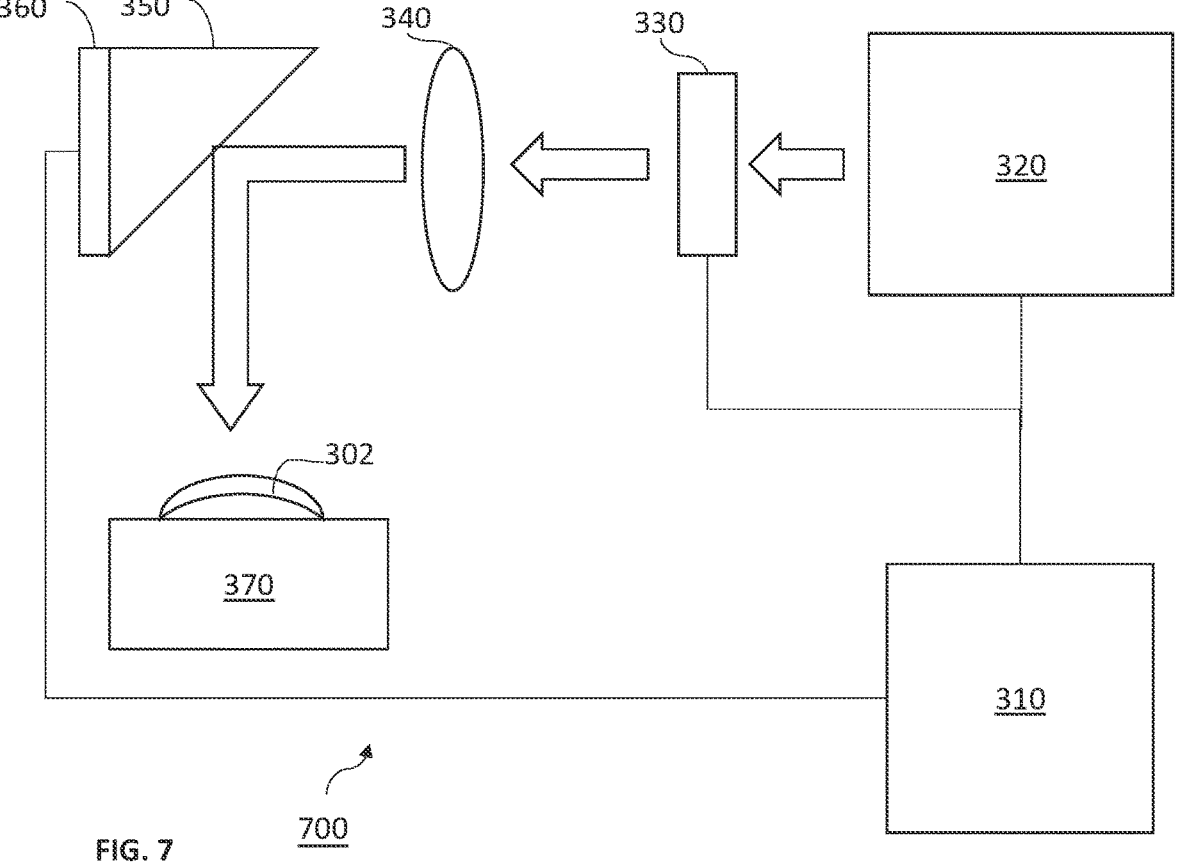
FIG. 7      700

OPHTHALMIC LENSES FOR REDUCING MYOPIA PROGRESSION AND LASER-BASED METHODS FOR FORMING THE SAME

CROSS-REFERENCE TO RELATED APPLICATIONS

This application claims priority to U.S. Application Ser. No. 63/194,905, filed on May 28, 2021, entitled OPHTHAL-MIC LENSES FOR REDUCING MYOPIA PROGRES-SION AND LASER BASED METHODS FOR FORMING THE SAME, the disclosure of which is incorporated herein by reference.

FIELD OF THE INVENTION

This disclosure relates to ophthalmic lenses for reducing myopia progression and methods for modifying ophthalmic lenses (e.g., single vision or multi-focal stock lenses) to include optical features for reducing myopia progression. More specifically, this technology relates to systems and methods for generating regions with altered refractive index (e.g., to form scattering centers or lenslets) in ophthalmic lenses through laser exposure using a laser interaction layer, e.g., a layer that interacts substantially different with the laser compared to other layers or the bulk of the lens material.

BACKGROUND

The eye is an optical sensor in which light from external sources is focused, by a lens, onto the surface of the retina, an array of wavelength-dependent photosensors. The lens of the eye can accommodate by changing shape such that the focal length at which external light rays are optimally or near-optimally focused to produce inverted images on the surface of the retina that correspond to external images observed by the eye. The eye lens focuses light, optimally or near-optimally, emitted by, or reflected from external objects that lie within a certain range of distances from the eye, and less optimally focuses, or fails to focus objects that lie outside that range of distances.

In normal-sighted individuals, the axial length of the eye, or distance from the front of the cornea to the fovea of the retina, corresponds to a focal length for near-optimal focus-ing of distant objects. The eyes of normal-sighted individu-als focus distant objects without nervous input to ciliary muscles which apply forces to alter the shape of the eye lens, a process referred to as "accommodation." Closer, nearby objects are focused, by normal individuals, as a result of accommodation.

Many people, however, suffer from eye-length-related disorders, such as myopia ("nearsightedness"). In myopic individuals, the axial length of the eye is longer than the axial length required to focus distant objects without accom-modation. As a result, myopic individuals can view near objects at a certain distance clearly, but objects further away from that distance are blurry.

Typically, infants are born hyperopic, with eye lengths shorter than needed for optimal or near-optimal focusing of distant objects without accommodation. During normal development of the eye, referred to as "emmetropization," the axial length of the eye, relative to other dimensions of the eye, increases up to a length that provides near-optimal focusing of distant objects without accommodation. Ideally, biological processes maintain the near-optimal relative eye length to eye size (e.g., axial length) as the eye grows to final, adult size. However, in myopic individuals, the relative axial length of the eye to overall eye size continues to increase during development, past a length that provides near-optimal focusing of distant objects, leading to increas-ingly pronounced myopia.

It is believed that myopia is affected by environmental factors as well as genetic factors. Accordingly, myopia may be mitigated by therapeutic devices which address environ-mental factors. For example, therapeutic devices for treating eye-length related disorders, including myopia, are described in U.S. Pub. No. 2011/0313058A1.

SUMMARY

Techniques for forming optical elements (e.g., scattering centers and/or lenslets, such as in the shape of dots) on an ophthalmic lens are disclosed. The optical elements can be sized, shaped, and distributed across the lens surface to reduce development of myopia in a wearer. The ophthalmic lens includes a laser interaction layer disposed at a surface of the lens that, when exposed to laser radiation, facilitates the formation of the optical elements. For example, the laser interaction layer can include a dye or other photosensitive material that strongly absorbs light at the laser's wavelength. In some cases, the laser interaction layer enables forming patterns of optical elements on the lens economically, effi-ciently, and/or with greater precision than directly exposing a lens to laser light without a laser interaction layer. More-over, the laser interaction layer allows for a high degree of customization of the pattern of the optical elements on the lens, paving the way toward customized myopia manage-ment solutions for each individual.

In general, in a first aspect, the invention features a method for forming optical elements at a surface of an ophthalmic lens including a lens material. The method includes: (1) providing a laser interaction layer at a surface of the ophthalmic lens, the laser interaction layer including a first material having a first absorption of radiation at a first wavelength, $\lambda_1$, the lens material having a second absorption of radiation at $\lambda_1$, the second absorption being lower than the first absorption; and (2) exposing discrete areas of the laser interaction layer to radiation at $\lambda_1$ sufficient to form an optical element (e.g., a lenslet, a scattering center) at each discrete area in the lens material.

In general, in another aspect, the invention features an ophthalmic lens, including: a lens material having opposing curved surfaces shaped to provide a base curvature of the ophthalmic lens, the opposing curved surfaces including a first surface; a plurality of optical elements arranged in a pattern at the first surface, the optical elements correspond-ing to regions having a refractive index different from a refractive index of the lens material and/or a surface shape different from a curvature of the first surface; and a laser interaction layer at the first surface, the laser interaction layer comprising a first material having a first absorption of radiation at a first wavelength, $\lambda_1$, the lens material having a second absorption of radiation at $\lambda_1$, the second absorption being lower than the first absorption.

In general, in a further aspect, the invention features an ophthalmic lens, including: a lens material having opposing curved surfaces shaped to provide a base curvature of the ophthalmic lens, the opposing curved surfaces comprising a first surface; and a laser interaction layer at the first surface, the laser interaction layer including a first material having a first absorption of radiation at a first wavelength, $\lambda_1$, the lens

3 material having a second absorption of radiation at $\lambda_1$, the second absorption being lower than the first absorption.

Implementations of these aspects can include one or more of the following features. For example, the ophthalmic lens can include one or more additional layers disposed on the first surface along with the laser interaction layer, the one or more additional layers having a composition different from the laser interaction layer. The one or more additional layers can be selected from the group consisting of: a hardcoat, a UV blocking layer, an anti-reflection layer, a photochromic layer, and a hydrophobic layer. The additional layer(s) can include a first layer wherein the laser interaction layer is located between the first layer and the lens material. The first layer can be composed of a material that has an absorption of radiation at $\lambda_1$ that is lower than the absorption of the first material. The material composing the first layer can have an absorption that is lower than the absorption of the lens material.

The ophthalmic lens can include a reflective layer that is reflective at $\lambda_1$ (e.g., reflects 50% or more of normally incident light at $\lambda_1$.) The reflective layer can be transparent for at least some visible wavelengths. The reflective layer can be located between the lens material and the laser interaction layer.

Among other advantages, the techniques and articles described herein can improve cosmetics of ophthalmic lenses (e.g., lenses for myopia reduction), improve performance of the resulting lens, and/or improve resilience properties like aging and/or de-lamination. Other advantages are described or implied in the description herein.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 1A is a cross-sectional view of a portion of an ophthalmic lens with a laser interaction layer provided at a lens surface.

FIG. 1B is a cross-sectional view of the portion of the ophthalmic lens during laser exposure.

FIG. 1C is a cross-sectional view of the portion of the ophthalmic lens after laser exposure with optical elements formed at the surface.

FIG. 2 is a cross-sectional view of a portion of another ophthalmic lens with another example of a laser interaction layer on a surface.

FIG. 3 is a cross-sectional view of a portion of yet another ophthalmic lens with another example of a laser interaction layer on a surface.

FIG. 4 is a cross-sectional view of a portion of another ophthalmic lens after laser exposure with optical elements formed at the interface of surface layer and bulk material.

FIG. 5 is a cross-sectional view of a portion of another ophthalmic lens with another example of a laser interaction layer in the bulk material of the lens at a surface.

FIG. 6B is a flowchart showing an example method for making an ophthalmic lens that includes optical elements.

FIG. 7 is a schematic diagram of an example laser system for forming optical elements on an ophthalmic lens.

4

Figures 8A, 8B:
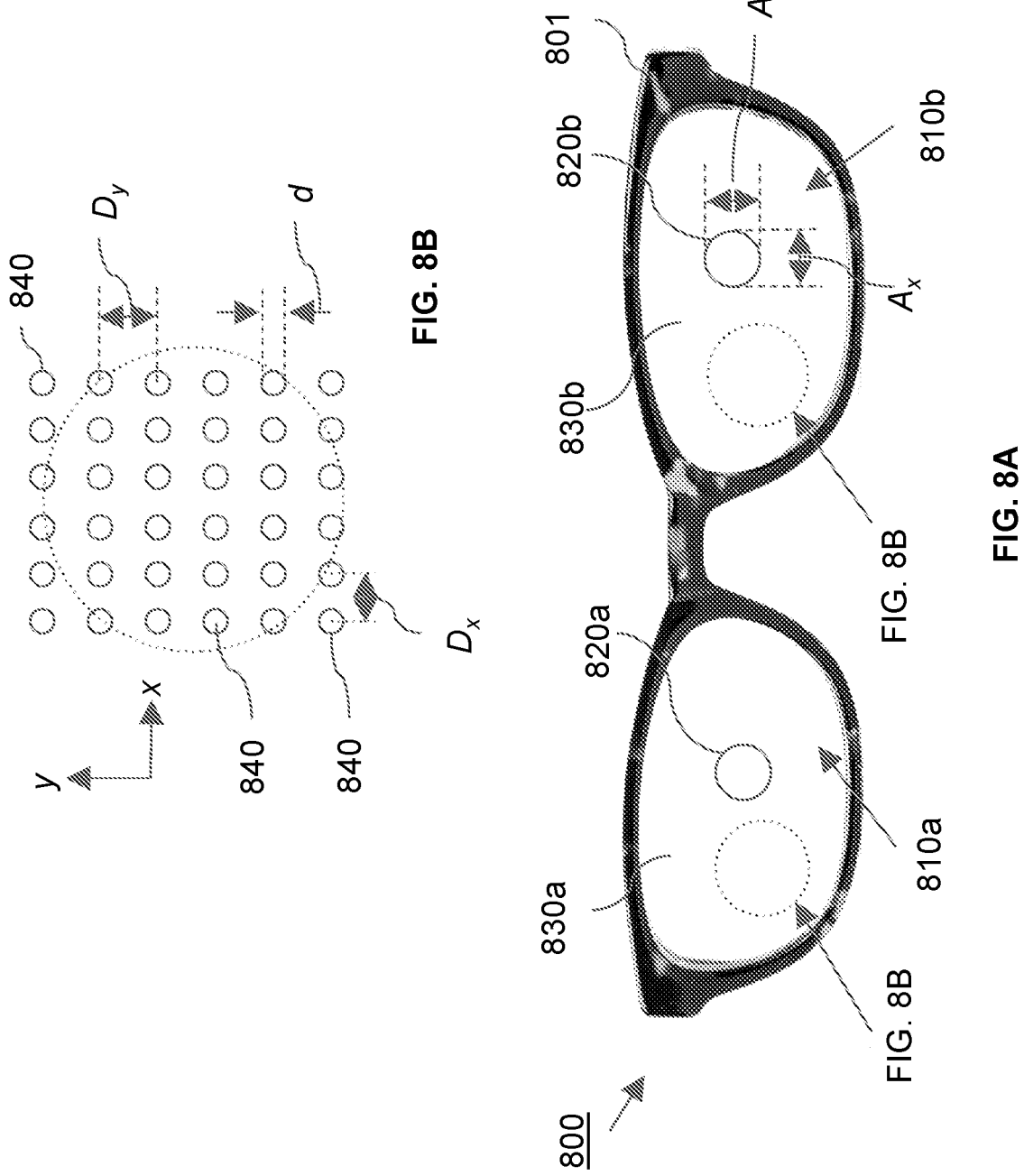
FIG. 8A shows a pair of eyeglasses containing ophthalmic lenses for slowing myopia.

FIG. 8B shows an optical element pattern on the ophthalmic lenses shown in FIG. 8A.

Figures 9A, 9B, 9C:
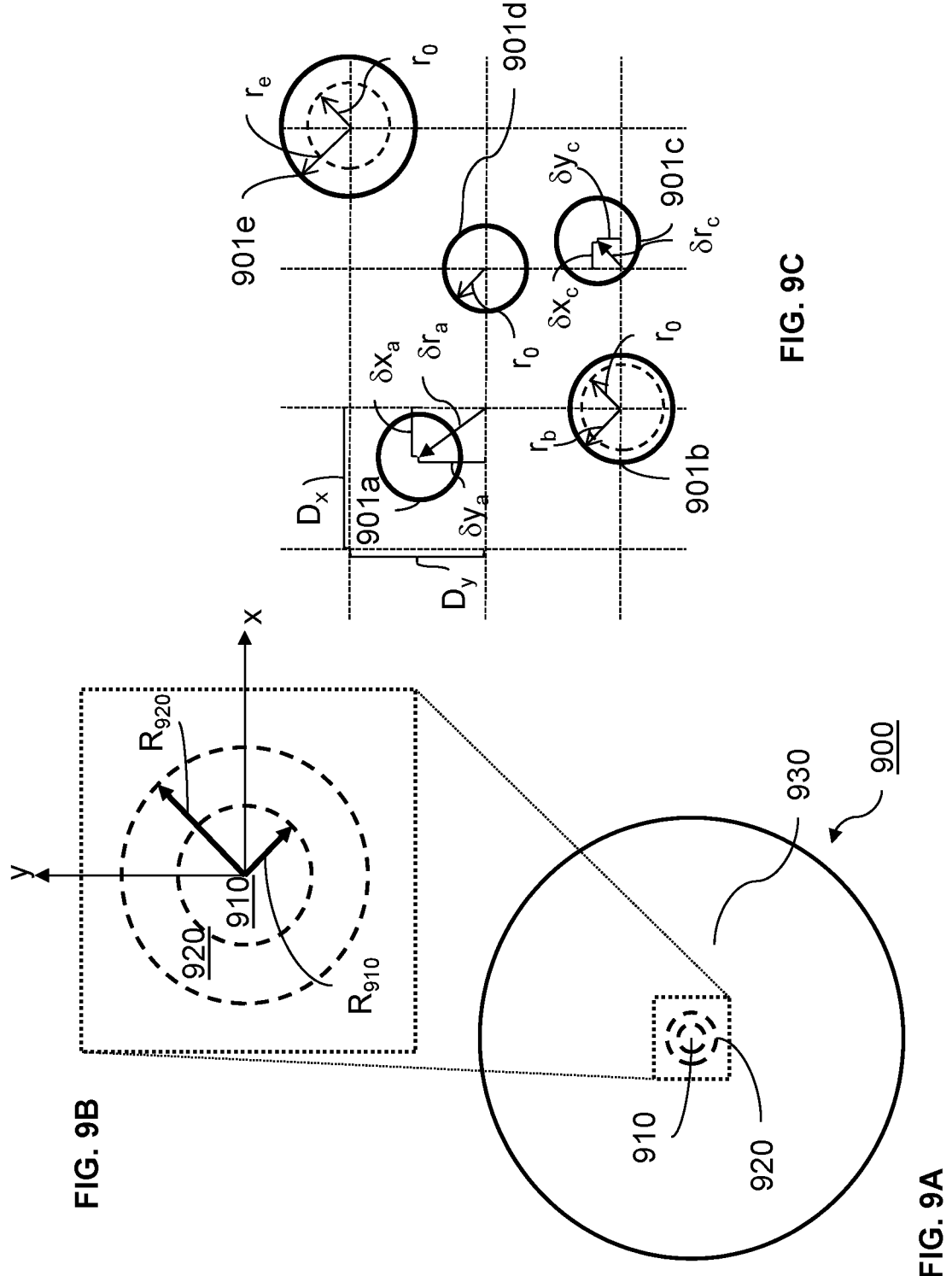

FIGS. 9A and 9B show a lens blank with an optical element pattern that has a transition zone between a clear aperture and the optical element pattern.

FIG. 9C shows optical elements with a random displacement from uniform spacing.

Like reference numbers and designations in the various drawings indicate like elements.

DETAILED DESCRIPTION

Techniques are disclosed for forming optical elements, such scattering centers or lenslets, at a surface of an ophthalmic lens. In general, the optical elements are sized, shaped, and arranged relative to each other so that they provide an optical effect sufficient to reduce myopia progression in a wearer. Example optical elements and configurations are described in: U.S. patent Ser. No. 10/571,717 B2, filed Sep. 27, 2018, entitled "OPHTHALMIC LENSES FOR TREATING MYOPIA;" PCT/US2019/015724 filed Jan. 29, 2019, entitled "OPHTHALMIC LENSES WITH LIGHT SCATTERING FOR TREATING MYOPIA;" and PCT/US2021/033026, filed May 18, 2021, entitled "OPHTHALMIC LENSES, METHODS OF MANUFACTURING THE OPHTHALMIC LENSES, AND METHODS OF DISPENSING EYE CARE PRODUCTS INCLUDING THE SAME," and PCT/US2019/063982, filed Dec. 2, 2019, entitled "LIGHT SCATTERING LENS FOR TREATING MYOPIA AND EYEGLASSES CONTAINING THE SAME," the entire contents each of which are incorporated herein by reference.

In general, the disclosed techniques involve providing (e.g., coating or depositing) a laser interaction layer on a surface of an ophthalmic lens (e.g., a stock ophthalmic lens, e.g., single vision or progressive) and exposing the laser interaction layer to laser radiation to form optical elements at (e.g., on or adjacent to) the lens surface. Upon exposure to appropriate laser radiation, the laser interaction layer facilitates formation of optical elements at the surface of the lens. This is illustrated in FIGS. 1A-1C. Referring to FIG. 1A, a coated lens 10 includes a laser interaction layer 100 on a surface 115 of a lens body 111. Generally, surface 115 is a curved surface, shaped, along with an opposing surface on the opposite side of lens body 111 to provide the base curvature (e.g., to provide a positive or negative spherical optical power and/or cylinder, or zero optical power in the case of a plano lens). Commonly, lens 10 is a meniscus lens and, while surface 115 is depicted as a convex surface, a laser interaction layer can also be applied to concave lens surfaces. Generally, the lens body 111 is formed from an optically transparent material, e.g., a transparent polymeric material such as Trivex or polycarbonate.

Generally, the composition and thickness of laser interaction layer 100 is selected to facilitate the formation of optical elements at surface 115 upon exposure of the laser interaction layer 100 to appropriate laser radiation. This is illustrated in FIGS. 1B and 1C. Specifically, FIG. 1B shows lens 10 during exposure to laser beams 119 and 121 focused inside the laser interaction layer at locations 126 and 123, respectively. Laser radiation is absorbed locally by laser interaction layer 100, modifying lens body 111 at surface 115 to form discrete optical elements 133 and 131 (see, FIG. 1C). The geometry of optical elements 133 and 131 (i.e. width, depth, and height) depends on factors such as the laser interaction layer thickness, laser radiation energy and exposure time, and absorptivity of laser interaction layer at laser wavelength. In some examples, the thickness of the laser interaction layer is in a range from 0.2 microns to 15 microns (e.g., 0.5 microns or more, 1 micron or more, 2 microns or more, such as 12 microns or less, 10 microns or less, 8 microns on less, such as from 3 microns to 5 microns). While FIG. 1B depicts simultaneous exposure of locations 126 and 123, exposure to locations can be sequential.

The energy density of the laser beam will affect the physical/and or chemical interaction of the laser radiation with the laser interaction layer 100. For instance, for certain pulse energies, the laser interaction layer 100 can be melted where it is exposed to form an optical element. At some pulse energies, optical elements can be formed by causing the laser interaction layer 100 and/or the lens material to foam or cavitate. For some pulse energies, the interaction between the laser and the laser interaction layer 100 can result in a color change to the lens material and/or the laser interaction layer 100 (e.g., by charring). In still other instances, the laser interaction layer 100 and/or bulk lens material can be removed from the lens surface by ablation.

Other laser parameters can also influence the nature of optical elements formed. These include the laser wavelength, exposure time (e.g., how long the laser interaction layer 100 is exposed), and number of passes (e.g., exposing an area in the laser interaction layer 100 multiple times), each of which can be selected to achieve a desired modification of the laser interaction layer 100. In addition, the interaction between the laser light and the laser interaction layer 100 will depend on the material of the laser interaction layer 100. For example, the material of the laser interaction layer 100 can be configured to avoid discoloration of the underlying lens material due to laser light exposure.

The composition of the laser interaction layer 100 includes a material that absorbs radiation at the operative wavelength of the laser, which can be UV, visible, or IR radiation. For example, the material can be selected to have a particular band gap, or any other appropriate physical property, to facilitate absorption only at a specific wavelength that corresponds to the wavelength of laser radiation. The absorption by the laser interaction layer at the laser's operative wavelength can be higher than the absorption by the bulk material of lens body 111. This can be advantageous, for example, by reducing possible damage to the lens body due to laser radiation exposure, helping to localize modification of the refractive index of the lens bulk material and shape of lens surface to form the optical elements, and/or facilitating optical element formation with higher efficiency due to enhanced absorption. For example, where the optical elements are formed due to local thermal effects, laser absorption by the laser interaction layer can provide more rapid heating and/or better localization of the heated surface compared to direct exposure of the lens surface. The result can be quicker optical element formation, lower laser energy required for optical element formation, and/or greater control over the size and shape of the optical element.

In some embodiments, exposure of the laser interaction layer to radiation can change the lens bulk material from transparent to absorptive at certain wavelengths. For instance, the exposing radiation can burn the lens material and/or the laser interaction layer 100 in order to form optical elements in the lens material or on its surface.

In another example, as shown in FIG. 1B, the laser interaction layer 100 can include a dye. Suitable dye materials can include, e.g., those commercially available from Epolin, LLC (Newark, New Jersey). The dye can be selected to have high absorption at the laser wavelength (e.g., UV or IR) but can have comparatively low absorption at other wavelengths (e.g., visible wavelengths). For instance, the laser interaction layer can have an absorption coefficient that is twice as high or more (e.g., ×3 or more, ×5 or more, ×10 or more, ×20 or more) as the bulk lens material. Such a laser interaction layer can provide a lens that is substantially clear and color free across the visible spectrum, even with the laser interaction layer still on. In order to subplant the optical element, the absorption coefficient at the laser wavelength of the top layer(s) can be chose to be lower than in the material in which the optical element is designed to be formed (e.g., ×⅓ or less, ×⅕ or less, ×1/10 or less, ×1/20 or less).

In general, a variety of different lasers can be used to form optical elements and paired with appropriate laser interaction layers. In some embodiments, ultrafast lasers with high peak powers (femtosecond or picosecond lasers) can be used. For example, a commercial femtosecond laser system can be used to irradiate the laser interaction layer 100 to form optical elements of a desired shape and size.

In general, laser interaction layer 100 can be deposited on surface 115 using conventional coating or deposition methods appropriate for the material forming the layer. For example, laser interaction layer can be formed on the lens surface using thermal evaporation, electron beam assist evaporation, physical vapor deposition (PVD), sputtering, chemical vapor deposition (CVD), atomic layer deposition (ALD), liquid phase coating (e.g., spin coating, or dip coating), spray coating, polymerization, or in any other appropriate technique. Laser interaction layer 100 can be deposited out of a solution, which is flashed off after coating.

After formation of the optical elements, the laser interaction layer can remain as part of the finished lens, or can be removed (e.g., by rinsing in an appropriate solvent).

In general, other layers can be deposited over the laser interaction layer, e.g., before or after exposure to the laser radiation. For example, referring to FIG. 2, a lens 12 includes lens body 111, a laser interaction layer 200 on surface 115 of the lens, and another layer 210 on top of laser interaction layer 200. Layer 210 can be a hardcoat or hydrophobic coating, for example. Generally, layer 210 can provide a function unrelated to formation of the optical elements (e.g., mechanical and/or chemical protection). In addition, in some cases, layer 210 can influence the absorption characteristics of the laser light.

In some embodiments, one or more layers can be disposed on the lens surface between the laser interaction layer and the lens. For example, referring to FIG. 3, a lens 13 includes a first layer 311 in between a laser interaction layer 301 and surface 115 of the lens. A second layer 321 is formed on top of laser interaction layer 301.

In certain embodiments, first layer 311 is selected to reflect radiation at the operative laser wavelength. Such configurations can serve to further enhance laser radiation absorption by the laser interaction layer 301 because laser radiation that would otherwise be transmitted into the lens body 111 is reflected back into the laser interaction layer 301. Examples of such layers are dielectric multilayer stacks (e.g., forming a Bragg reflector) designed to reflect light at the laser wavelength.

In some embodiments, first layer 311, closest to surface 115 of the lens, is a UV and/or blue light blocking layer. Such arrangements can be advantageous where UV or blue laser radiation is used to form the optical elements.

Either or both of the additional layers 311 and 321 can perform the function of protecting the underlying lens material from damage due to laser exposure when the optical elements are formed, and can be configured to physically withstand laser light exposure, e.g., such that the layers do not form micro-cracks, or any other undesirable features, when exposed to laser light. Alternatively, or additionally, the additional layers 311 and/or 321 can reduce delamination of the multilayer structure before, during, or after, laser exposure, e.g., by enhancing adhesion and/or reducing differential expansion between adjacent layers.

In another example the laser interaction layer is applied via transbonding to the bulk material. Transbonding processes may include the use of adhesives or film insert molding as examples.

In yet another example the laser interaction layer is formed via 3D printing techniques, including techniques that use film inserts in the additive manufacturing process.

More generally, a laser interaction layer can form a part of a multi-layer stack on a lens surface, e.g., along with one or more layers such as anti-scratch coatings (e.g., hardcoats, including multilayer hardcoats), UV protective coatings, photochromic coatings, and anti-reflective (AR) coatings. The laser interaction layer can be at any appropriate location in the multilayer stack to facilitate formation of optical elements at the lens surface.

In some examples, the laser interaction layer can serve additional functions in addition to facilitating formation of optical elements by laser exposure. For example, by strongly absorbing light in the UV part of the spectrum, the laser interaction layer may serve as a UV protective coating in addition to facilitating optical element formation by exposure to a UV laser. Similarly, the laser interaction layer can serve as a blue light filtering layer in a blue-cut lens (e.g., lenses that reduce the amount of light from 380-420 nm, e.g., known to cause visual fatigue).

In certain examples, the laser interaction layer is composed of more than one component layers. For example, a laser interaction layer can include a component layer that strongly reflects light at the laser wavelength beneath (i.e., closer to the lens surface) that another layer that strongly absorbs radiation at the laser wavelength. Such a reflector can serve the dual purpose of reducing the amount of laser radiation entering the lens body and increasing the amount of laser light in the absorbing layer due to the double pass of the light reflected by the reflective layer. Multilayer dielectric stacks can be used to strongly reflect light at specific wavelength while being relatively transparent at other wavelengths and such stacks can be used for this purpose.

While the foregoing example features forming optical elements by locally modifying the shape of surface 115 of the lens, in some implementations the lens surface remains substantially unchanged, and the optical elements are formed by modifying the optical properties of the bulk material forming the lens at the lens surface. For example, referring to FIG. 4, a coated lens 14 includes lens body 111 and a laser interaction layer 400 which facilitates formation of optical elements 430 and 431 in the bulk material of lens body 111 at surface 115 without changing the shape of surface 115. For example, laser interaction layer can locally heat the bulk material of the lens to a temperature at which an index of refraction of the bulk material changes to form an optical element.

In the prior examples, the laser interaction layer is a layer disposed on the lens surface or part of a stack of layers disposed on the lens surface. However, other embodiments are possible. For example, the laser interaction layer can be a layer incorporated into the bulk material of the lens at the lens surface. Such an example is illustrated in FIG. 5, in which a lens 15 includes a laser interaction layer 500, which is formed by infusing a material in the bulk of the lens body 111 through surface 115. In some embodiments, laser interaction layer can be a dye for absorbing radiation at the operative laser wavelength that can diffuse into the bulk material of the lens at the lens surface.

Several examples have been described and other examples are possible. For instance, while the foregoing features laser interaction layers on a single surface of the lens, in some examples, both lens surfaces can include laser interaction layers, e.g., for forming optical elements at opposing surfaces of the lens.

Figure 6A:
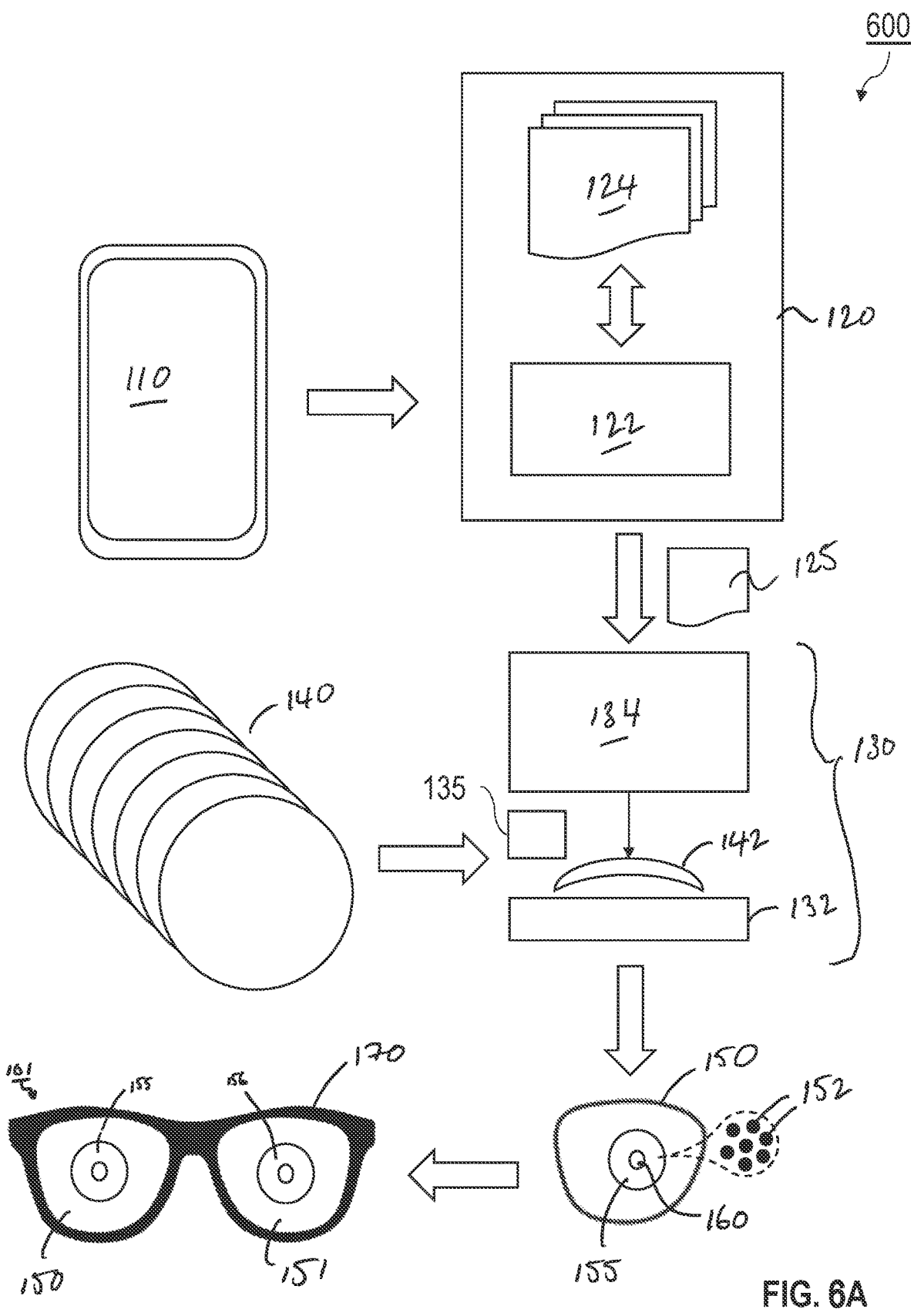
FIG. 6A is a diagram illustrating an example system and workflow for delivering customized ophthalmic lenses for a pair of eyeglasses.

Referring to FIG. 6A, an example system 600 for dispensing eyeglasses 101 includes an input terminal 110 and a data processing apparatus 120 in communication with a lens modification system 130. Eyeglasses 101 include lenses 150 and 151 that are mounted in eyeglass frames 170. Each lens 150, 151 includes a pattern 155, 156 of optical elements that are formed on the lenses by lens modification system 130 as part of a customization process.

Input terminal 110 can be, for example, a computer terminal or a mobile device (such as tablet computer or mobile phone) running a software application facilitating operation of system 600. Data processing apparatus 120 includes a processing module 122 (e.g., with one or more computer processors), which retrieves or calculates information 124 about pattern 155 of optical elements to be formed on the lens. For example, the optical elements can include lenslets, scattering centers, and/or Fresnel lens elements, which can be arranged according to pattern 155. In some embodiments, the optical elements reduce progression of myopia in the user of eyeglasses 101. Upon selection, system 600 sends information 125 about pattern 155 to lens modification system 130.

System 600 is designed to allow modification of a variety of lenses 140 to include pattern 155 of optical elements. That is, the system is designed to modify lens blanks available commercially from numerous ophthalmic lens companies. These include single vision prescription lenses, multifocal lenses, and plano lenses. The lenses 140 are generally formed from glass or plastic. A lens 142 for modification is typically selected according to the needs (e.g., Rx) and preferences (e.g., lens material, coatings) of the user.

Lens modification system 130 includes a platform 132 which positions the selected lens 142 relative to an exposure apparatus 134 or vice versa. Depending on the implementation, the exposure apparatus 134 can either deposit material on a surface of the lens to form the optical elements, or it exposes the lens to radiation which modifies the surface and/or bulk of lens 142 to form the optical elements. Lens modification system 130 also includes a lens alignment module, e.g., an optical alignment module or a physical stop, which aligns lens 142 relative to exposure apparatus 134 to ensure that the pattern is formed according to a specified relative alignment between the lens and the pattern.

System 600 controls the relative orientation between lens 142 and exposure apparatus 134 to form optical elements on the lens according to the pattern 155. After forming pattern 155 of optical elements 152 on lens 142, the edge of the lens is shaped (e.g., milled) to fit eyeglass frames 170 in a process commonly called edging. Alternatively, the edge of the lens is shaped to fit eyeglass frames 170 before forming pattern 155 of optical elements 152 on lens 142. A second lens is modified in the same way to provide the second lens 151 for mounting in eyeglass frames 170.

The process outlined in FIG. 6A can include additional steps. For example, Additional coatings can be applied to one or both lens surfaces either before or after application of pattern 155. Examples include UV or blue light filters, anti-reflective coatings, photochromic coatings or layers, polarizers, mirror coatings, tints, and hardcoats. In some cases, additional shaping of a lens surface is performed, e.g., to customize a multifocal lens to the user either before or after application of pattern 155.

This process can be carried out at an optical store, distribution center, optical lab, or centralized manufacturing facility. Because the lens modification can be performed locally on lenses from a lens inventory, and in coordination with existing eyeglass dispensing protocols, Just-in-Time delivery of a highly customized pair of eyeglasses that includes a pattern of optical elements, such as a customized pattern of optical elements, is possible.

Referring also to FIG. 6B, in some implementations, personalized eyeglasses 101 are provided by a sequence 180 that may be performed entirely at the eye care professional's office or in concert with a distribution center, optical lab, or centralized manufacturing facility. In a first step 181, the eye care professional determines the patient's prescription, e.g., by refracting the subject. This step determines the power of the ophthalmic lens upon which the pattern is formed. The patient also chooses their eyeglass frames in the same way they would for regular prescription glasses. In some embodiments, eyeglass frames may be chosen from a retail store, and the lens shape can be communicated to the edging location by (i) providing a model number so that the trace shape can be retrieved from a database; (ii) performing a frame trace process at the store and providing the trace shape electronically; or (iii) shipping the frame to the edging location so that the edging facility can obtain the trace shape. In an alternative embodiment, eyeglass frames may be chosen from a "static frameboard", where one or more in-store models match eyeglass frames in inventory at the edging facility.

The eyecare professional can also gather additional information for selecting the pattern. Generally, the pattern can take into account factors such as a lens prescription (Rx) for the patient, a pupil size of the patient, a vergence of the patient, a pupillary distance of the patient, a gaze angle of the patient, a measure of myopic progression of the patient, a predisposition of the patient to myopia (e.g., a genetic predisposition or behavioral influence factors), the lens final shape and size once mounted to the spectacle frame, a measure of conspicuity of the pattern of optical elements to others, a measure of comfort level of the patient, an optical center height for a given pupil relative to a frame for the patient, a patient preference or choice (e.g., an outline shape of the pattern), and an eyecare professional's preference (e.g. dosage of treatment effect).

In the next step 182, the system identifies a pattern of optical elements suitable for the patient. This identification can include selecting from several pre-established patterns (e.g., stored in a database of patterns) or calculating a new pattern according to a pattern generating algorithm. For example, the pattern can be calculated by the system to have a certain outline or density profile selected by a user.

Parameters for the pattern that can be varied include, for example, the type of optical element (e.g., lenslets, scattering centers, Fresnel lenses), a size of the optical elements, their density, and the shape of the area they occupy. Further parameters include a size, shape, and location of any clear apertures, as well as the location of the pattern on the lens. Each of these may be individualized depending on the desired optical effect of the pattern on the wearer (e.g., an amount of contrast reduction in the peripheral vision and clear aperture angular range) and/or the conspicuity of the pattern to observers who see the eyeglasses being worn.

Once the system establishes the pattern, information about the pattern is transferred to the lens modification system, in step 183. This information can include one or more data files in a format readable by lens modification system 130. For example, commercial software suitable for generating images (e.g., Microsoft Office products such as Visio, PowerPoint, or Word; Adobe Photoshop, Adobe Illustrator, SolidWorks) may be used in conjunction with standard driver software to generate control signals for the lens modification system 130. For example, the pattern can be specified in a file format such as WinLase Professional Job (WLJ), WinLase Professional Object (WLO), HPGL Plotter File (PLT), Windows Enhanced Metafile (EMF), Windows MetaFile (WMF), AutoCad (DXF), AutoCad (DWG), Adobe Illustrator (AI), CorelDRAW (CDR), Excellon2 File (EX2), Windows Bitmap (BMP), JPEG Bitmap (JPG), CompuServe Bitman (GIF), PaintBrush (PCX), TruView Job (JOB), or TruView Object (MCL) file. The pattern encoded in such a file could be generated using computer code, for example using a computer programming language such as AppleScript, JavaScript, Python, C++, and the like. Alternatively, or additionally, custom software and file formats can be used. Such a pattern can be generated by the software using input parameters from a specific user, such as an eyecare professional or a patient. Such a custom pattern can be generated in a short time that allows for rapid, Just-In-Time manufacturing, such as in 24 hours or less (e.g., 12 hours or less, 1 hour or less, 50 minutes or less, 40 minutes or less, 30 minutes or less, 20 minutes or less, 10 minutes or less, e.g., 1 minute or less, 40 second or less, 30 seconds or less, 10 seconds or less, 1 second or less).

Next, in step 184, the lens modification system 130 aligns the lens relative to the system or vice versa in order to form the pattern at the specified location on the lens. This can involve physically moving the lens with respect to the lens modification system and/or a software adjustment that translates, rotates, and/or scales the size of the pattern to accommodate the position of the lens. Once aligned, in step 185, the system modifies the lens according to the information about the pattern to form optical elements in the desired pattern.

In step 186, the lenses edges are shaped, and the shaped lenses mounted in the frames.

In general, these steps can occur in other sequences. For example, the lenses could be edged and shaped in step 186 before the optical elements are formed on the lens in step 185.

In some embodiments, both the lens and the pattern are radially symmetric. In other words, the lens and patterns both have symmetry about a central axis. This can also be referred to as rotationally symmetric. For example, a plano lens or a lens having only spherical power, when provided with a circular edge, is a radially symmetric lens. In general, lenses having a circular edge are referred to as circular lenses, even though the curvature of the surfaces extend out of the plane of the circle defined by the edge.

Further, the optical elements can be arranged in a pattern that has radial symmetry about a geometric center of the pattern. Such patterns generally have a circular perimeter and, optically, perform the same function regardless of which radial direction the user looks through. In such cases, a geometric center of the pattern, such as the center of a clear aperture within an annular region of optical elements, can be aligned to the optical center of the lens. For such a spherical lens, the optical center often coincides with the geometric center of the lens. Alignment of the pattern to the lens in such cases can be achieved, for example, by measuring and marking the optical center using a lensometer and aligning the pattern with the marked optical center prior to forming the pattern on the lens.

However, more generally, the foregoing techniques can also be used to form rotationally asymmetric patterns on radially symmetric or radially asymmetric lenses. Generally, this involves establishing a relative alignment between the lens and the pattern that accounts for the asymmetries before forming the optical elements. The system adjusts the alignment as necessary so that the relative alignment is as specified. In some embodiments, structural and/or optical alignment features can be formed on the lens that allow for alignment of the lens within the lens modification system before forming the optical elements.

Referring to FIG. 7, an example laser system 700 for forming optical elements on a surface of a lens includes a laser 320, a laser beam attenuator 330, focusing optics 340, a right-angle prism mirror 350, and a stage 370. Laser 320 directs a laser beam towards mirror 350, which steers the beam towards a lens 302 which is positioned relative to the mirror 350 by stage 370. An actuator 360 (e.g., a piezoelectric actuator) is attached to mirror 350. Laser system 300 also includes a controller (e.g., a computer controller) in communication with laser 320, beam chopper 330, and actuator 360.

Laser beam attenuator 330 and focusing optics 340 are positioned in the beam path. Beam attenuator 330 attenuates the beam so that the exposed laser energy to lens 302 can be adjusted and controlled (e.g., pulsed). Focusing optics 340, which generally includes one or more optically powered elements (e.g., one or more lenses), focuses the beam to a sufficiently small spot on the surface of lens 302 so that the area modified by the beam on the lens surface can be shaped to the desired pattern feature size. Actuator 360 changes the orientation of mirror 350 with respect to the beam to scan the pulsed beam to different target points on the lens surface. Controller 310 coordinates the operation of laser 320, beam attenuator 330, and actuator 360 so that the laser system forms the predetermined optical element pattern on the lens.

In some implementations, stage 370 also includes an actuator. The stage actuator can be a multi-axis actuator, e.g., moving the lens in two lateral dimensions orthogonal to the beam propagation direction. Alternatively, or additionally, the actuator can move the stage along the beam direction. Moving the stage along the beam direction can be used to maintain the exposed portion of the lens surface at the focal position of the beam, notwithstanding the curvature of the lens surface, thereby maintaining a substantially constant beam size and laser energy density across the lens surface. The stage actuator can also be controlled by controller 310, which coordinates this stage motion with the other elements of the system. In some embodiments, a stage actuator is used in place of the mirror actuator.

Furthermore, in some implementations, the orientation and position of optical or structural features of the lens is captured using, e.g., a focimeter, lensometer, optical mapper, CCD camera with feature detection software, mechanical fixture or tracer to catch on mechanical structure, etc. before introduction to the systems 600 and 700. The lens is then held in place in a known orientation and position based on the previous measurement using, e.g., clamps, fixtures, jigs, suction cups, etc. and is introduced into the systems 600 and 700, without losing the orientation and position information. This transfer can be effectuated, e.g., by use of robotic arms, manual transfer into a holder or known position and orientation, rotary turntable with fixed locking positions, etc. Alternatively, the apparatus for capturing orientation and position of optical and structural features of the lens, including the aforementioned examples, can be integrated with other components of the system, e.g., in an actuated stage 370, conveyor or a rotary table. In general, implementations can include machine vision and automated alignment of the lens to various system components to achieve the desired placement of the pattern of optical elements on the lens.

Generally, laser 320 can be any type of laser capable of generating light with sufficient energy to modify the lens material at the surface. Gas lasers, dye lasers, solid state lasers, and semiconductor lasers can be used. Generally, many laser technologies suitable for, e.g., machining applications can be used. Gas lasers include certain excimer lasers (e.g., XeCl at 308 nm) and XeF at 353 nm). Another kind of gas laser that can be used include certain infrared lasers, such as a CO2 laser (having an emission wavelength at 9.4 $\mu$m or 10.6 $\mu$m) can be used. Commercially available laser systems can be used such as, for example, CO2 laser systems made by Universal Laser Systems, Inc. (Scottsdale, AZ), (e.g., the 60W VLS 4.60 system). Examples of solid state lasers that can be used include Ytterbium-doped glass lasers emitting at 1 $\mu$m and chromium-doped alexandrite lasers (e.g., emitting visible or near IR wavelengths). Examples of semiconductor lasers that may be used include InGaAsP or InGaAsP lasers.

The pulse duration and pulse energy are typically selected to modify an amount of material at the lens surface to provide an optical element of a desired size.

While the foregoing example lens modifications systems involve forming optical elements on the lens surface, alternatively, or additionally, optical elements can be embedded in the lens material itself. For example, the lens material and laser exposure system can be selected so that the exposure causes a local change in the refractive index of the bulk lens material itself, forming optical elements (e.g., scattering centers or lenslets) in the body of the lens.

Referring to FIG. 8A, myopia-reducing eyeglasses 800 are shown which allow treatment of both eyes simultaneously. Myopia-reducing eyeglasses 800 are composed of a pair of eyeglass frames 801 and ophthalmic lenses 810a and 810b mounted in the frames. Generally, the ophthalmic lenses can be plano lenses, single vision lenses (e.g., with positive or negative power) or multivision lenses (e.g., bifocals or progressive lenses). Ophthalmic lenses 810a and 810b each have a clear aperture 820a and 820b, respectively, surrounded by reduced-contrast areas 830a and 830b, respectively. Clear apertures 820a and 820b are positioned to coincide with the wearer's on-axis viewing position, while reduced contrast areas 830a and 830b correspond to the wearer's peripheral vision. Referring also to FIG. 8B, reduced contrast areas 830a and 130b are composed of an array of optical elements 840, which reduce the contrast of an object in the wearer's peripheral vision by scattering light passing through those areas to the wearer's eye. In general, optical elements 840 can are provided using the techniques described above.

The size and shape of the clear aperture may vary. Generally, the clear aperture provides the wearer with a viewing cone for which their visual acuity may be optimally corrected (e.g., to 20/15 or 20/20). In some examples, the aperture has a maximum dimension (in the x-y plane) in a range from about 0.2 mm (e.g., about 0.3 mm or more, about 0.4 mm or more, about 0.5 mm or more, about 0.6 mm or more, about 0.7 mm or more, about 0.8 mm or more, about 0.9 mm or more) to about 1.5 cm (e.g., about 1.4 cm or less, about 1.3 cm or less, about 1.2 cm or less, about 1.1 cm or less, about 1 cm or less). Where the aperture is circular, e.g., as depicted in FIG. 8A, this dimension corresponds to the circle's diameter (i.e., $A_x = A_y$), however non-circular (e.g., elliptical, polygonal, $A_x \neq A_y$) apertures are also possible. In some examples, the lenses do not have a clear aperture at all, and the optical elements are included across the visual axis. In some examples, the magnitude of optical effect can be varied across the aperture area, e.g., by varying the optical element size and shape. Also, the density of the optical elements can be varied across the aperture area.

The clear aperture can subtend a solid angle of about 30 degrees or less (e.g., about 25 degrees or less, about 20 degrees or less, about 15 degrees or less, about 12 degrees or less, about 10 degrees or less, about 9 degrees or less, about 8 degrees or less, about 7 degrees or less, about 6 degrees or less, about 5 degrees or less, about 4 degrees or less, about 3 degrees or less) in the viewer's visual field. The solid angles subtended in the horizontal and vertical viewing planes may be the same or different.

In general, the optical element patterns in reduced-contrast areas 830a and 830b can be selected based on a variety of design parameters to provide a desired degree of light scattering on the user's retina. Generally, these design parameters include the optical element density, their size and shape, and their refractive index, for example, and are discussed in more detail below. Ideally, the patterns are selected to provide high visual acuity on the fovea and reduced image contrast on other parts of the retina with sufficiently low discomfort to the wearer to allow for extended, continuous wear. For instance, it can be desirable for children to be comfortable wearing the eyeglasses for most, if not all, of a day.

It is believed that reduced imaged contrast on the fovea of the user's eye is less efficient at controlling eye growth than reducing image contrast on other parts of the user's retina. Accordingly, the dot pattern can be tailored to reduce (e.g., minimize) light scattered into the user's fovea, while relatively more of the light on other parts of the retina is scattered light. The amount of scattered light on the fovea can be affected by the size of clear apertures 820a and 820b, respectively, but also by the nature of the optical elements, especially those closest to the clear apertures. In some examples, for example, the optical elements closest to the clear apertures can be designed for less efficiently light scattering than those further away.

In certain embodiments, optical elements can be designed to deliver reduced narrow angle scattering and increased wide angle scattering to create even light distribution on the retina (reduce contrast), while preserving acuity through geometry of scattering centers. For example, the optical elements can be designed to generate significant wide forward angle scattering (e.g., such as more than 10%, 20% or more, 30% or more, 40% or more, 50% or more, deflected by more than 2.5 deg.). Narrow angle forward scattering, i.e., within 2.5 deg., can be kept relatively low (e.g., 50% or less, 40% or less, 30% or less, 20% or less).

In general, a variety of different metrics can be used to evaluate the performance of optical elements patterns in order to optimize them for use in spectacle-based myopia management solutions. For example, optical elements patterns can be optimized empirically, e.g., based on physical measurements of lenses with different optical elements patterns. For example, light scattering can be characterized based on haze measurements, such as international test standards for haze (e.g., ASTM D1003 and BS EN ISO 13468). Conventional hazemeters can be used, e.g., a BYK- Gardner haze meter (such as the Haze-Gard Plus instrument) that measures how much light is totally transmitted through a lens, the amount of light transmitted undisturbed (e.g., within 0.5 deg.), how much is deflected more than 2.5 deg. (haze), and clarity (amount within 2.5 deg.). Other equipment can also be used to characterize light scattering for purposes of empirically optimizing scattering patterns. For example, equipment which measures light diffusion by measuring light in annular ring around 2.5 deg. can be used (e.g., equipment from Hornell).

Alternatively, or additionally, optical elements patterns can be optimized by ray-tracing computer modelling software (e.g., Zemax or Code V).

In some embodiments, optical elements patterns can be designed based on optimization of a point spread function, which is a representation of the resolution and distribution of light provided by the optical elements on the retina. For example, the size, shape, and spacing of the optical elements can be varied to evenly spread illumination of retina such that the retina outside of fovea is homogeneously blanketed with scattered light to reduce (e.g., minimize) contrast at this region of the retina.

Alternatively, or additionally, optical elements patterns can be designed based on optimization of a modulation transfer function, which refers to the spatial frequency response of the human visual system. For instance, the size, shape, and spacing of the optical elements can be varied to smoothen attenuation of a range of spatial frequencies. Design parameters of the optical element pattern can be varied in order to increase or decrease certain spatial frequencies as desired. Generally, the spatial frequencies of interest for vision are 18 cycles per deg. on the fine side, and 1.5 cycles per deg. on the course side. Optical element patterns can be designed to provide increased signal at certain subsets of spatial frequencies within this range.

Other tools such as projecting a simulated image on the retina can be used to simulate what the eye is seeing through optical elements patterns. For example, several library image files are available in optical simulation software, that can be related directly to visual acuity. Since normal visual acuity (20/20) corresponds to resolution of a five-bar letter such as E that subtends 5 minutes of arc in object space, a retinal image size of 0.024 mm is produced. Simulated letter E on the retina shows variation in image quality in the presence of optical elements patterns. This can be useful when comparing retinal images before and after changes in an optical system.

The aforementioned metrics can be used to evaluate optical element patterns based on the size and/or shape of the dots, both of which can be varied as desired. For example, the optical elements can be substantially round, elongate (e.g., ellipsoidal), or irregularly-shaped. Generally, the optical elements should have a dimension (e.g., diameter, as depicted in FIG. 1B) that is sufficient large to scatter visible light, yet sufficiently small so as not to be resolved by the wearer during normal use. For example, the optical elements can have a dimension (as measured in the x-y plane) in a range from about 0.001 mm or more (e.g., about 0.005 mm or more, about 0.01 mm or more, about 0.015 mm or more, about 0.02 mm or more, about 0.025 mm or more, about 0.03 mm or more, about 0.035 mm or more, about 0.04 mm or more, about 0.045 mm or more, about 0.05 mm or more, about 0.055 mm or more, about 0.06 mm or more, about 0.07 mm or more, about 0.08 mm or more, about 0.09 mm or more, about 0.1 mm) to about 1 mm or less (e.g., about 0.9 mm or less, about 0.8 mm or less, about 0.7 mm or less, about 0.6 mm or less, about 0.5 mm or less, about 0.4 mm or less, about 0.3 mm or less, about 0.2 mm or less, about 0.1 mm).

Note that for smaller optical elements, e.g., having a dimension that is comparable to the wavelength of light (e.g., 0.001 mm to about 0.05 mm), the light scattering may be considered Raleigh or Mie scattering. For larger optical elements, e.g., about 0.1 mm or more, light scattering may be due to geometric scattering.

In general, the dimension of the optical elements may be the same across each lens or may vary. For example, the dimension may increase or decrease as a function of the location of the optical elements, e.g., as measured from the clear aperture and/or as a function of distance from an edge of the lens. In some embodiments, the protuberance dimensions vary monotonically as the distance from the center of the lens increases (e.g., monotonically increase or monotonically decrease). In some cases, monotonic increase/decrease in dimension includes varying the diameter of the optical elements linearly as a function of the distance from the center of the lens.

The optical elements shown in FIG. 8B are arranged on a square grid, spaced apart by a uniform amount in each direction. This is shown by $D_y$ in the y-direction and $D_x$ in the x-direction. In general, the optical elements are spaced so that, collectively, they provide sufficient contrast reduction in the viewer's periphery for myopia reduction. Typically, smaller optical element spacing will result in greater contrast reduction (provided adjacent dots do not overlap or merge). In general, $D_x$ and $D_y$ are in a range from about 0.05 mm (e.g., about 0.1 mm or more, about 0.15 mm or more, about 0.2 mm or more, about 0.25 mm or more, about 0.3 mm or more, about 0.35 mm or more, about 0.4 mm or more, about 0.45 mm or more, about 0.5 mm or more, about 0.55 mm or more, about 0.6 mm or more, about 0.65 mm or more, about 0.7 mm or more, about 0.75 mm or more) to about 2 mm (e.g., about 1.9 mm or less, about 1.8 mm or less, about 1.7 mm or less, about 1.6 mm or less, about 1.5 mm or less, about 1.4 mm or less, about 1.3 mm or less, about 1.2 mm or less, about 1.1 mm or less, about 1 mm or less, about 0.9 mm or less, about 0.8 mm or less). As an example, optical elements spacing can be 0.55 mm, 0.365 mm, or 0.240 mm.

While the dots shown in FIG. 8B are arranged with equal spacing in the x- and y-directions, more generally spacing in each direction may be different. Furthermore, optical elements may be arrayed in grids that are not square. For example, hexagonal grids may be used. Non-regular arrays are also possible, e.g., random or semi-random dot placement may be used. In the case of a random pattern dimensions given would be the average separation of the dots in x- and y-directions.

In general, the coverage of a lens by optical elements can vary as desired. Here, coverage refers to the proportion of the lens's total area, as projected onto the x-y plane that corresponds to an optical element. Typically, a lower optical element coverage will yield lower scattering than higher optical element coverage (assuming individual optical elements are discrete, i.e., they do not merger to form larger optical elements). Optical element coverage can vary from 10% or more to about 75%. For example, optical element coverage can be 15% or more, 20% or more, 25% or more, 30% or more, 35% of more, 40% or more, 45% or more, such as 50% or 55%). Optical element coverage can be selected according to a comfort level of a user, e.g., to provide a level of peripheral vision sufficiently comfortable that the wearer will voluntarily wear the eyeglasses for extended periods (e.g., all day).

While the optical elements are depicted as having circular footprints in FIG. 8B, more generally the optical elements can have other shapes. For example, the optical elements can be elongated in one direction (e.g., in the x-direction or y-direction), such as in the case of elliptical optical elements. In some embodiments, the optical elements are irregular in shape.

It is believed that light from a scene that is incident on the lenses in reduced contrast areas 830a and 830b between the dots contributes to an image of the scene on the user's retina, while light from the scene incident on the optical elements does not. Moreover, the light incident on the optical elements is still transmitted to the retina, so has the effect of reducing image contrast without substantially reducing light intensity at the retina. Accordingly, it is believed that the amount of contrast reduction in the user's peripheral field of view is correlated to (e.g., is approximately proportional to) the proportion of the surface area of the reduced-contrast areas covered by the optical elements. Generally, optical elements occupy at least 10% (e.g., 20% or more, 30% or more, 40% or more, 50% or more, such as 90% or less, 80% or less, 70% or less, 60% or less, e.g., 10% to 20%, 10% to 30%) of the area (as measured in the x-y plane) of reduced contrast area 830a and 830b.

In general, the optical element pattern reduces the contrast of images of objects in the wearer's peripheral vision without significantly degrading the viewer's visual acuity in this region. Here, peripheral vision refers to the field of vision outside of the field of the clear aperture. Image contrast in these regions can be reduced by 40% or more (e.g., 45% or more, 50% or more, 60% or more, 70% or, more, 80% or more) relative to an image contrast viewed using the clear aperture of the lens as determined. Contrast reduction may be set according to the needs of each individual case. It is believed that a typical contrast reduction would be in a range from about 50% to 55%. Contrast reductions of lower than 50% may be used for very mild cases, while subjects who are more predisposed might need a higher than 55% contrast reduction. Peripheral visual acuity can be corrected to 20/30 or better (e.g., 20/25 or better, 20/20 or better) as determined by subjective refraction, while still achieving meaningful contrast reduction.

Contrast, here, refers to the difference in luminance between two objects within the same field of view. Accordingly, contrast reduction refers to a change in this difference.

Contrast and contrast reduction may be measured in a variety of ways. In some embodiments, contrast can be measured based on a brightness difference between different portions of a standard pattern, such as a checkerboard of black and white squares, obtained through the clear aperture and dot pattern of the lens under controlled conditions.

Alternatively, or additionally, contrast reduction may be determined based on the optical transfer function (OTF) of the lens (see, e.g., http://www.montana.edu/jshaw/documents/18%20EELE582_S15_OTFMTF.pdf). For an OTF, contrast is specified for transmission of stimuli in which light and dark regions are sinusoidally modulated at different "spatial frequencies." These stimuli look like alternating light and dark bars with the spacing between bars varying over a range. For all optical systems the transmission of contrast is lowest for the sinusoidally varying stimuli having the highest spatial frequencies. The relationship describing the transmission of contrast for all spatial frequencies is the OTF. The OTF can be obtained by taking the Fourier transform of the point spread function. The point spread function can be obtained by imaging a point source of light through the lens on to a detector array and determining how light from a point is distributed across the detector.

In the event of conflicting measurements, the OTF is technique is preferred.

In some examples, contrast may be estimated based on the ratio of the area of the lens covered by optical elements compared to the area of the clear aperture. In this approximation, it is assumed that all the light that hits the optical elements becomes uniformly dispersed across the entire retinal area, which reduce the amount of light available in lighter areas of an image and this adds light to darker areas. Accordingly, contrast reduction may be calculated based on light transmission measurements made through the clear aperture and optical element pattern of a lens.

The lenses can be composed of polycarbonate. In addition to PC, the lenses themselves can also be made from allyl diglycol carbonate plastic, a urethane-based monomer or other impact resistant monomers. Alternatively, lenses could be made from one of the more-dense high-refractive index plastics with an index of refraction greater than 1.60. In some embodiments, the lenses are made from optically transparent materials with lower index of refraction (e.g., CR39 is at 1.50, Trivex is at 1.53).

As noted previously, in general, the size, spacing, and arrangement of the optical element pattern can vary. In some examples, the optical element pattern features a gradient in, e.g., optical element size and/or spacing. Optical element patterns can feature a gradient in scattering efficiency of the optical elements (e.g., due to a gradient in the refractive index mismatch and/or shape of each optical element). Graded optical element patterns can reduce the conspicuity of the pattern. For example, a graded transition from the clear portions of the lens to the scattering portion can be less conspicuous than a sharp transition.

In some embodiments, a lens can feature different zones in which the optical element pattern varies from zone-to-zone. For example, referring to FIGS. 9A and 9B, a lens 900 includes a clear aperture 910, a transition zone 920, and a scattering zone 930. Clear aperture 910 has a radius $R_{910}$ and transition zone 920 is an annular region surrounding the clear aperture having an inner radius $R_{910}$ and an outer radius $R_{920}$. The remainder of the lens area forms scattering zone 930.

Transition zone 920 features a dot pattern that scatters incident light less than the optical element pattern in scattering zone 930, providing a transition in the scattering properties of the lens from the clear aperture to the scattering zone. Such a transition may be advantageous in that it reduces scattering into the fovea compared to scattering that would be provided if the scattering zone extended to the clear aperture. A further advantage is that the transition zone may reduce the visibility of the optical element pattern to the user, providing a more comfortable wearing experience. This can be particularly important for children, where the likelihood that a child will regularly wear eyeglasses featuring such lenses for extended periods depends on the child's comfort level.

Generally, the optical element pattern in transition zone 920 can vary. In some examples, the transition zone features a uniform optical element pattern in which the optical elements have the same shape and size and are uniformly spaced. Alternatively, in certain examples, the optical element pattern in the transition zone can feature varying optical element density, spacing, and/or size. For example, the optical element pattern can be selected to provide the weakest scattering closest to the clear aperture, with monotonically increasing scattering at increasing radial distances from $R_{910}$ to $R_{920}$. For example, in some embodiments, the optical element density increases monotonically (e.g., linearly) from $R_{910}$ to $R_{920}$. By way of example, the optical element diameter can increase linearly from a first value (e.g., 0.05 mm) to a second value (e.g., 0.17 mm) as the radial distance from the lens axis increases from $R_{910}$ to $R_{920}$. Alternatively, or in addition, the optical element spacing can decrease monotonically (e.g., linearly) from $R_{910}$ to $R_{920}$.

Typically, $R_{910}$ is in a range from about 1 mm to about 3 mm (e.g., 1.0 mm to 1.1 mm, 1.1 mm to 1.2 mm, 1.2 mm to 1.3 mm, 1.3 mm to 1.4 mm, 1.4 mm to 1.5 mm, 1.5 mm to 1.6 mm, 1.6 mm to 1.7 mm, 1.7 mm to 1.8 mm, 1.8 mm to 1.9 mm, 1.9 mm to 2.0 mm, 2.0 mm to 2.1 mm, 2.1 mm to 2.2 mm, 2.2 mm to 2.3 mm, 2.3 mm to 2.4 mm, 2.4 mm to 2.5 mm, 2.5 mm to 2.6 mm, 2.6 mm to 2.7 mm, 2.7 mm to 2.8 mm, 2.8 mm to 2.9 mm, 2.9 mm to 3.0 mm).

$R_{920}$ can be in a range from about 2 mm to about 6 mm (e.g., 2.0 mm to 2.2 mm, 2.2 mm to 2.4 mm, 2.4 mm to 2.6 mm, 2.6 mm to 2.8 mm, 2.8 mm to 3.0 mm, 3.0 mm to 3.2 mm, 3.2 mm to 3.4 mm, 3.4 mm to 3.6 mm, 3.6 mm to 3.8 mm, 3.8 mm to 4.0 mm, 4.0 mm to 4.2 mm, 4.2 mm to 4.4 mm, 4.4 mm to 4.6 mm, 4.6 mm to 4.8 mm, 4.8 mm to 5.0 mm, 5.0 mm to 5.2 mm, 5.2 mm to 5.4 mm, 5.4 mm to 5.6 mm, 5.6 mm to 5.8 mm, 5.8 mm to 6.0 mm).

In some embodiments, the optical element pattern includes randomly displacing optical elements with respect to a regular array. Introducing random displacements can reduce optical effects associated with regularly spaced scattering centers, such as starburst-like glare. See, e.g., https://www.slrlounge.com/diffraction-aperture-and-starburst-effects/which illustrates the starburst effect as it relates to photography. Accordingly, including random displacements in optical element patterns can provide the user with a more comfortable experience compared with similar optical element patterns in which the optical elements are uniformly spaced. Alternatively, or additionally, randomization of the optical element pattern can reduce the optical effects (e.g., diffractive or interference effects) that manifest in reflected light, reducing the noticeability of the optical element patterns to observers.

Random displacements are illustrated in FIG. 9C, which shows optical elements 901a-901e positioned with respect to an array lattice in which adjacent lattice cites are spaced a distance $D_x$ from each other in the x-direction and a distance $D_y$ from each other in the y-direction. As illustrated, $D_x=D_y$, however, more generally, the vertical and horizontal lattice spacing can be different.

For each optical element, $\delta x = A_x \cdot D_x \cdot RN[0,1]$ and $\delta y = A_y \cdot D_y \cdot RN[0,1]$ where $A_x$ and $A_y$ are jitter amplitudes between 0 and 1 in the x- and y-directions, respectively, which may be the same or different. $RN[0,1]$ is a random number between 0 and 1.

Optical element size can also vary randomly, which can reduce optical effects associated with an array of uniformly sized optical elements, such as glare. For example, as illustrated in FIG. 9C, the radial dimension of each optical element can vary from a nominal optical element radius, $r_0$. As illustrated, optical element 401d has nominal radius $r_0$, while optical elements 401b and 401e have radii $r_b$ and $r_e$, respectively that are both larger than $r_0$ and $r_b \neq r_e$. Optical element radius can be set according to a formula $r_i = r_0 + \Delta r$, where $\Delta r = A_r \cdot r_0 \cdot RN[0,1]$, in which i refers to the i-th optical element and $A_r$ is the optical element radius jitter amplitude which is set to a value between 0 and 1.

More generally, while the example above refers to optical element radius of a nominally circular optical element, jitter can be applied to other optical element-size parameters depending on the application. For example, jitter can be applied to optical element volume or other optical element dimensions (e.g., x-dimension, y-dimension).

In some embodiments, optical element patterns can include both random jitter in optical element placement and random jitter in optical element size.

A number of embodiments have been described, other embodiments are in the following claims.

What is claimed is:

1. A method for forming optical elements at a surface of an ophthalmic lens comprising a lens material, the method comprising:

providing a laser interaction layer at a surface of the ophthalmic lens, the laser interaction layer comprising a first material having a first absorption of radiation at a first wavelength, $\lambda_1$, the lens material having a second absorption of radiation at $\lambda_1$, the second absorption being lower than the first absorption; and exposing discrete areas of the laser interaction layer to laser radiation at $\lambda_1$ sufficient to form an optical element at each discrete area in the lens material.

2. An ophthalmic lens, comprising:

a lens material having opposing curved surfaces shaped to provide a base curvature of the ophthalmic lens, the opposing curved surfaces comprising a first surface;

a plurality of optical elements arranged in a pattern at the first surface, the optical elements corresponding to regions having a refractive index different from a refractive index of the lens material and/or a surface shape different from a curvature of the first surface; and a laser interaction layer at the first surface, the laser interaction layer comprising a first material having a first absorption of radiation at a first wavelength, $\lambda_1$, the lens material having a second absorption of radiation at $\lambda_1$, the second absorption being lower than the first absorption.

3. An ophthalmic lens, comprising:

a lens material having opposing curved surfaces shaped to provide a base curvature of the ophthalmic lens, the opposing curved surfaces comprising a first surface; and a laser interaction layer at the first surface, the laser interaction layer comprising a first material having a first absorption of radiation at a first wavelength, $\lambda_1$, the lens material having a second absorption of radiation at $\lambda_1$, the second absorption being lower than the first absorption.

4. The ophthalmic lens of claim 3, further comprising one or more additional layers disposed on the first surface along with the laser interaction layer, the one or more additional layers having a composition different from the laser interaction layer.

5. The ophthalmic lens of claim 4, wherein the one or more additional layers are selected from the group consisting of: a hardcoat, a UV blocking layer, an antireflection layer, a photochromic layer, and a hydrophobic layer.

6. The ophthalmic lens of claim 4, wherein the at least one or more additional layers comprise a first layer wherein the laser interaction layer is located between the first layer and the lens material.

7. The ophthalmic lens of claim 6, wherein the first layer is composed of a material that has an absorption at of radiation at $\lambda_1$ that is lower than the absorption of the first material.

8. The ophthalmic lens of claim 7, wherein the material composing the first layer has an absorption that is lower than the absorption of the lens material.

9. The ophthalmic lens of claim 3, further comprising a reflective layer that is reflective at $\lambda_1$.

10. The ophthalmic lens of claim 9, wherein the reflective layer is transparent for at least some visible wavelengths.

11. The ophthalmic lens of claim 9, wherein the reflective layer is located between the lens material and the laser interaction layer.

* * * * *